US012561712B2

(12) United States Patent
Chan et al.

(10) Patent No.: US 12,561,712 B2
(45) Date of Patent: *Feb. 24, 2026

(54) LOYALTY POINT DISTRIBUTIONS USING A DECENTRALIZED LOYALTY ID

(71) Applicant: American Express Travel Related Services Company, Inc., New York, NY (US)

(72) Inventors: Calvin Chan, Mineola, NY (US); Christopher Cracchiolo, Old Bridge, NJ (US); Andras Ferenczi, Peoria, AZ (US); Andrew Martin Baal Thomas, Jersey City, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 704 days.

This patent is subject to a terminal disclaimer.

(21) Appl. No.: 17/857,471

(22) Filed: Jul. 5, 2022

(65) Prior Publication Data

US 2022/0351232 A1 Nov. 3, 2022

Related U.S. Application Data

(63) Continuation of application No. 16/277,782, filed on Feb. 15, 2019, now Pat. No. 11,397,962, which is a
(Continued)

(51) Int. Cl.
G06Q 30/02 (2023.01)
G06Q 30/0207 (2023.01)
(Continued)

(52) U.S. Cl.
CPC ..... G06Q 30/0229 (2013.01); G06Q 30/0215 (2013.01); G06Q 30/0236 (2013.01);
(Continued)

(58) Field of Classification Search
None
See application file for complete search history.

(56) References Cited

U.S. PATENT DOCUMENTS 8,719,056 B1 5/2014 Bartley et al.
9,251,528 B1 2/2016 Mcghie et al.
(Continued)

FOREIGN PATENT DOCUMENTS

CN 107070644 A 8/2017
CN 107079036 A 8/2017
(Continued)

OTHER PUBLICATIONS

Brack, S., et al., "Anonus: Anonymous Bonus Point System with Fraud Detection", 2017 IEEE 42nd Conference on Local Computer Networks (Year: 2017).*
(Continued)

*Primary Examiner* — Clay C Lee
(74) *Attorney, Agent, or Firm* — Thomas Horstemeyer, LLP

(57) ABSTRACT

A blockchain-based loyalty point distribution system may be configured to provide decentralized loyalty IDs. In one example, a system comprising a computing device that is configured to determine that a reward event has been initiated by a user and invoke executable code to display a user interface for selecting a loyalty provider for storing the reward event. The loyalty provider for storing the reward event is identified and the executable code is invoked to display a login page for the selected loyalty provider. A loyalty ID is determined and a customer reward to be written to a blockchain based at least in part on a public key.

20 Claims, 17 Drawing Sheets

Related U.S. Application Data continuation-in-part of application No. 16/168,477, filed on Oct. 23, 2018, now Pat. No. 11,699,166, which is a continuation-in-part of application No. 15/728,086, filed on Oct. 9, 2017, now Pat. No. 11,449,887.

(51) Int. Cl.

| | | |
|---|---|---|
| *G06Q 30/0226* | (2023.01) | |
| *H04L 9/32* | (2006.01) | |
| *H04L 9/00* | (2022.01) | |

(52) U.S. Cl.

CPC ....... *G06Q 30/0239* (2013.01); *H04L 9/3239* (2013.01); *H04L 9/3297* (2013.01); *H04L 9/50* (2022.05); *H04L 2209/56* (2013.01)

(56) References Cited

U.S. PATENT DOCUMENTS

| | | | |
|---|---|---|---|
| 9,767,474 | B1 | 9/2017 | Ramalingam et al. |
| 9,785,912 | B2 | 10/2017 | Quezada |
| 11,025,433 | B1 | 6/2021 | Griffin et al. |
| 11,107,569 | B1 | 8/2021 | Devoto |
| 2002/0178354 | A1 | 11/2002 | Ogg et al. |
| 2003/0014373 | A1 | 1/2003 | Perge et al. |
| 2003/0200144 | A1 | 10/2003 | Antonucci et al. |
| 2006/0259361 | A1 | 11/2006 | Barhydt et al. |
| 2010/0191594 | A1 | 7/2010 | White et al. |
| 2012/0253852 | A1 | 10/2012 | Pourfallah et al. |
| 2013/0103484 | A1 | 4/2013 | McLaughlin |
| 2014/0108263 | A1 | 4/2014 | Ortiz et al. |
| 2015/0120418 | A1 | 4/2015 | Cervenka et al. |
| 2015/0262139 | A1 | 9/2015 | Shtylman |
| 2016/0210626 | A1 | 7/2016 | Ortiz et al. |
| 2016/0283941 | A1 | 9/2016 | Andrade |
| 2016/0292672 | A1 | 10/2016 | Fay et al. |
| 2016/0342977 | A1 | 11/2016 | Lam |
| 2016/0379213 | A1 | 12/2016 | Isaacson et al. |
| 2017/0017936 | A1 | 1/2017 | Bisikalo et al. |
| 2017/0124556 | A1 | 5/2017 | Seger, II |
| 2017/0132626 | A1 | 5/2017 | Kennedy |
| 2017/0140408 | A1 | 5/2017 | Wuehler |
| 2017/0169248 | A1 | 6/2017 | Darcy |
| 2017/0186057 | A1 | 6/2017 | Metnick |
| 2017/0232300 | A1 | 8/2017 | Tran et al. |
| 2017/0236143 | A1 | 8/2017 | Code et al. |
| 2017/0243239 | A1 | 8/2017 | El-Eid et al. |
| 2017/0279774 | A1 | 9/2017 | Booz et al. |
| 2017/0286951 | A1 | 10/2017 | Ignatchenko et al. |
| 2017/0289809 | A1 | 10/2017 | Smith et al. |
| 2017/0352033 | A1 | 12/2017 | Buckman et al. |
| 2018/0025442 | A1* | 1/2018 | Isaacson ................. H04L 51/48 |
| | | | 705/26.62 |
| 2018/0089645 | A1 | 3/2018 | McDonald et al. |
| 2018/0094953 | A1 | 4/2018 | Colson et al. |
| 2018/0117446 | A1 | 5/2018 | Tran et al. |
| 2018/0227118 | A1 | 8/2018 | Bibera et al. |
| 2018/0247320 | A1* | 8/2018 | Gauld ................. G06Q 30/0201 |
| 2018/0268401 | A1 | 9/2018 | Ortiz et al. |
| 2018/0293573 | A1* | 10/2018 | Ortiz ..................... G06Q 20/20 |
| 2018/0341971 | A1* | 11/2018 | Shah ................. G06Q 30/0229 |
| 2018/0349891 | A1 | 12/2018 | Putre et al. |
| 2019/0073666 | A1 | 3/2019 | Ortiz et al. |
| 2019/0108542 | A1 | 4/2019 | Durvasula et al. |
| 2019/0128998 | A1 | 5/2019 | Josefsberg et al. |
| 2019/0180311 | A1 | 6/2019 | Chan et al. |
| 2019/0306137 | A1 | 10/2019 | Isaacson et al. |
| 2019/0311392 | A1 | 10/2019 | Swamidurai |
| 2019/0312877 | A1 | 10/2019 | Zhang et al. |
| 2019/0325473 | A1 | 10/2019 | Swamidurai |
| 2019/0370847 | A1 | 12/2019 | Khan |
| 2020/0090188 | A1 | 3/2020 | Wince et al. |
| 2020/0126108 | A1 | 4/2020 | Khan et al. |
| 2020/0167815 | A1* | 5/2020 | Naik ..................... G16H 10/60 |
| 2021/0199460 | A1 | 7/2021 | Yerli |
| 2021/0202067 | A1 | 7/2021 | William et al. |
| 2021/0279762 | A1 | 9/2021 | Eklund |

FOREIGN PATENT DOCUMENTS

| | | | | |
|---|---|---|---|---|
| EP | 3454238 | A1 | 3/2019 | |
| KR | 101591244 | B1 | 2/2016 | |
| KR | 20160050876 | A | 5/2016 | |
| KR | 20160095720 | A | 8/2016 | |
| KR | 20160114749 | A | 10/2016 | |
| KR | 20160132307 | A | 11/2016 | |
| WO | 2017069874 | A1 | 4/2017 | |
| WO | 2017136956 | A1 | 8/2017 | |
| WO | 2018064645 | A1 | 4/2018 | |
| WO | WO-2019009913 | A1 * | 1/2019 | ............. G06Q 20/06 |

OTHER PUBLICATIONS

Da Costa, S., "Implementing a Loyalty Card for Smartphones Using a Bitcoin Like Approach," Global ProQuest Dissertations Publishing, Oct. 2014, 119 pages.

International Search Report and Written Opinion in PCT/US2018/047640, mailed Oct. 1, 2018, 7 pages.

International Search Report and Written Opinion in PCT/US2019/022798, mailed Jun. 13, 2019, 6 pages.

International Search Report and Written Opinion in PCT/US2019/026818, mailed Jun. 28, 2019, 8 pages.

International Search Report and Written Opinion in PCT/US2020/017350, mailed Apr. 24, 2020, 16 pages.

Mierlo et al., "Behavioral Economics, Wearable Devices, and Cooperative Games: Results From a Population-Based Intervention to Increase Physical Activity," JMIR Serious Games, Jan. 2016, 16 pages.

Mitchell et al., "Uptake of an Incentive-Based mHealth App: Process Evaluation of the Carrot Rewards App," JMIR mHealth Uhealth, vol. 5, May 2017, 14 pages.

Non-Final Office Action in U.S. Appl. No. 15/728,086, mailed Sep. 6, 2019, 19 pages.

Noyen et al., "When Money Learns to Fly: Towards Sensing as a Service Applications Using Bitcoin," arXiv:1409.5841, Sep. 2014, 6 pages.

Sullivan et al., "Behavior Change with Fitness Technology in Sedentary Adults: A review of the Evidence for Increasing Physical Activity," Frontiers in Public Health, vol. 4, Article 289, Jan. 2017, 16 pages.

Sweeney, E., "AmEx Pilots Blockchain-Based Loyalty Rewards with Boxed," Marketingdive, May 2018, [retrieved on Jan. 31, 2020]. Retrieved from the Internet <URL:https://www.marketingdive.com/news/amex-pilots-blockchain-based-loyalty-rewards-with-boxed/524452/>, 3 pages.

* cited by examiner

1600

LOYALTY POINT DISTRIBUTIONS USING A DECENTRALIZED LOYALTY ID

CROSS REFERENCE TO RELATED APPLICATIONS

This application is a continuation of, claims priority to, and the benefit of, U.S. Ser. No. 16/277,782, filed Feb. 15, 2019, and entitled "LOYALTY POINT DISTRIBUTIONS USING A DECENTRALIZED LOYALTY ID," which is a continuation-in-part of, and claims priority to, U.S. application Ser. No. 16/168,477, filed on Oct. 23, 2018 and entitled "MULTI-MERCHANT LOYALTY POINT PARTNERSHIP." The '477 application is a continuation-in-part of, and claims priority to, U.S. application Ser. No. 15/728, 086 filed on Oct. 9, 2017, and entitled, "SYSTEMS AND METHODS FOR LOYALTY POINT DISTRIBUTION." All are hereby incorporated by reference herein in their entirety for all purposes.

FIELD

This disclosure generally relates to loyalty points, and more particularly, to systems and methods for loyalty point distributions using a decentralized loyalty ID.

BACKGROUND

Payment networks typically implement various systems for processing transactions between merchants and customers. Merchants are members of the payment network and the merchants are authorized to charge to customer accounts. Customers have a transaction account with the payment network. To complete a transaction, a merchant typically transmits a payment request (or settlement) to the payment network with transaction details and the card member's account information. For payment networks using loyalty points, options for using points are often limited to a few merchants.

Payment networks typically face increased costs and limitations associated with the traditional payment model. The payment network implements secure protocols for handling the payment requests, and such secure protocols along with network infrastructure are costly to develop and maintain. The high network costs also result in high fees charged to merchants using the payment network. Additional programs supported by a payment network such as loyalty points, multi-merchant loyalty point partnerships, non-transaction-based loyalty point distributions, or decentralized loyalty IDs, for example, further increase costs associated with security and infrastructure.

SUMMARY

Systems, methods, and articles of manufacture (collectively, the "system") for loyalty point distributions using decentralized loyalty IDs are disclosed. The system may invoke a loyalty iFrame in response to receiving a rewards event, wherein the loyalty iFrame is associated with a loyalty provider, and wherein the loyalty iFrame is invoked by executing an embedded SDK based on the rewards event. The system may determine a loyalty ID based on a customer login credential received via the loyalty iFrame. The system may write a customer reward to a loyalty blockchain, wherein the customer reward comprises the rewards event and the loyalty ID, and wherein the customer reward is written to the loyalty blockchain by updating a loyalty point ledger associated with the loyalty ID.

In various embodiments, the operation of determining the loyalty ID may comprise: receiving via the loyalty iframe the customer login credential; transmitting via the loyalty iFrame the customer login credential to the loyalty provider; and receiving via the loyalty iFrame the loyalty ID in response to the loyalty provider matching the customer login credential to the loyalty ID.

In various embodiments, the loyalty provide may receive a notification in response to the customer reward being written to the blockchain. The loyalty provider may distribute a local reward based on the customer login credential and updates the loyalty point ledger on the blockchain based on the distributed local reward. The loyalty provider may update a loyalty partner balance on the blockchain based on the distributed local reward. The system may receive a balance update notification in response to the loyalty partner balance being updated on the blockchain. The system may initiate a payment to the loyalty provider based on the loyalty partner balance, wherein in response to receiving the payment the loyalty provider updates the loyalty partner balance on the blockchain based on the payment.

In various embodiments, the system may receive a transaction request, wherein the transaction request comprises a loyalty point payment request. The system may invoke the loyalty iFrame, wherein the loyalty iFrame is invoked by executing the embedded SDK. The system may determine the loyalty ID based on a second customer login credential received via the loyalty iFrame. The system may transmit the loyalty ID and the transaction request to the loyalty provider, wherein in response to receiving the loyalty ID and the transaction request the loyalty provider updates the loyalty point ledger on the blockchain based on the loyalty point payment request. In response to receiving the loyalty ID and the transaction request the loyalty provider may process and authorize the transaction.

In various embodiments, the rewards event may be received in response to a behavioral interaction. The rewards event may be received in response to an initiated transaction. The initiated transaction may be initiated as part of a multi-merchant loyalty point partnership, and wherein the rewards event is based on the multi-merchant loyalty point partnership.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
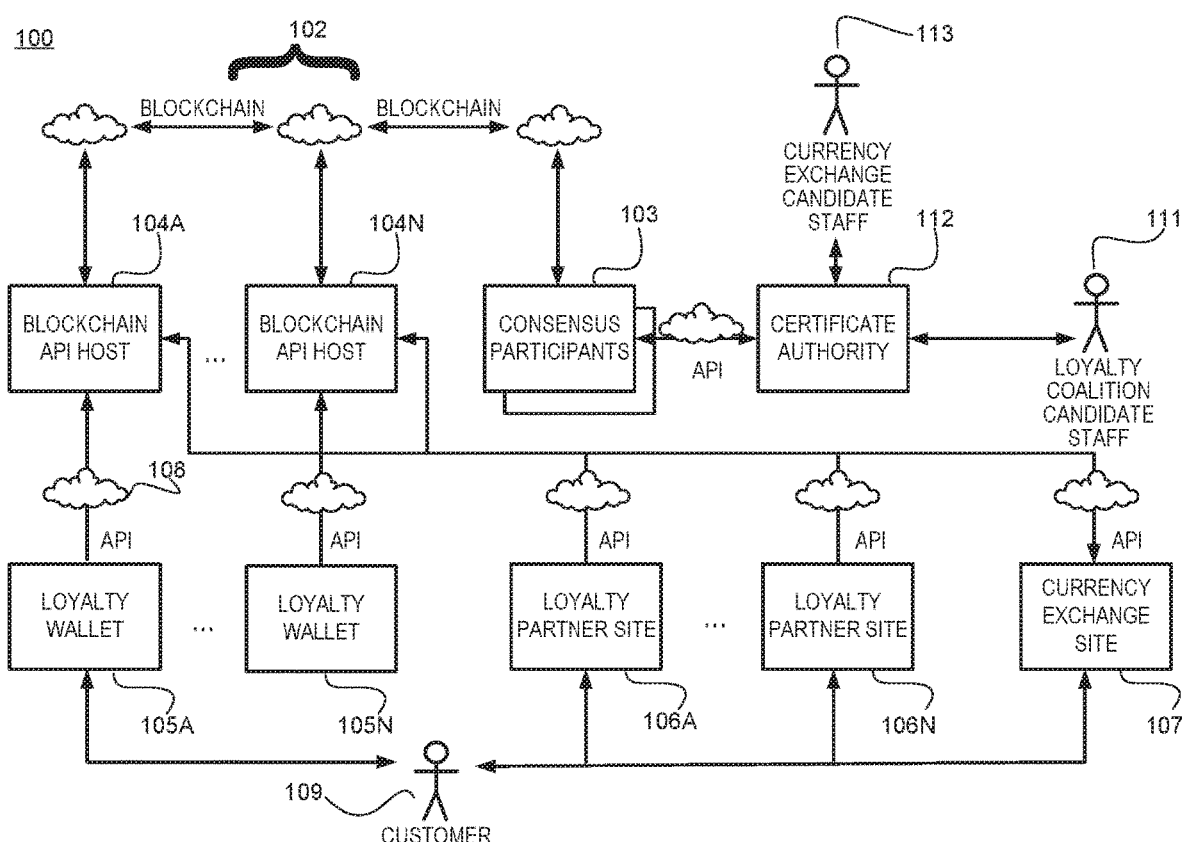
FIG. 1 illustrates a loyalty point or digital currency system configured to operate on a public, private, or semi-private ledger maintained on a blockchain, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

A payment network based on peer-to-peer payments may be used to facilitate most functions of traditional card payment networks and to enable additional services and functionality. For example, a blockchain driven peer-to-peer payment network enables near-instant transaction authorization and settlement. Payment, authorization, and/or settlement on such a network may result in money changing hands in an hour, 10 minutes, a minute, or less depending on the infrastructure used to implement the payment network. For a blockchain-based peer-to-peer payment network, a governing organization or consortium may control access to bank transfer services. Anyone can participate in the payment network, but in various embodiments, only users that registered with the managing organization(s) may transfer earned credits into fiat currency via wire transfers to bank accounts. The blockchain may autonomously manage workflows associated with payment processing as described in greater herein.

The payment networks use a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain.

The payment networks may also implement smart contracts that enforce data workflows in a decentralized manner. For example, such payment networks may enable digital currency smart contracts that enforce business workflows in a decentralized manner and keep track of account balances. The payment networks may also enable reputation based smart contracts that act as a directory of trustworthy entities as part of the payment network.

A digital currency issuer may be included in the payment network and may be configured to transfer balances between external banks and digital currency-based wallets vie electronic funds transfer (EFT) systems. The digital currency issuer may also connect customers with lenders to convert lines of credit into digital currencies. The payment network may also include digital wallet services deployed on user devices such as, for example, computers, tablets, smartphones, Internet of Things devices (IoT devices), etc. The digital wallet services may enable payments by interacting with the smart contracts and the blockchain underpinning the payment network.

FIG. 1 depicts a loyalty point network 100 that operates on a blockchain 102, in accordance with various embodiments. Loyalty point network 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

Blockchain 102 may be a distributed database that maintains records in a readable manner and that is resistant to tampering. Blockchain 102 may be based on blockchain technologies such as, for example, ETHEREUM®, Open Chain, Chain Open Standard, HYPERLEDGER® Fabric, CORDA CONNECT®, INTEL® Sawtooth, etc. Blockchain 102 may comprise a ledger of interconnected blocks containing data. Each block may link to the previous block and may include a timestamp. The blocks can hold file transfer data, smart contract data, and/or other information as desired. Each block may link to the previous block and may include a timestamp. Blockchain 102 may be maintained on various blockchain nodes (e.g., consensus participants 103), and may be maintained in the form of copies or partial copies of the blockchain 102, as discussed further herein. Blocks may be written to blockchain 102 by establishing consensus between the blockchain nodes. For example, consensus may be established based on proof of work, proof of stake, practical byzantine fault tolerance, delegated proof of stake, or other suitable consensus algorithms. When implemented in support of loyalty point network 100, the blockchain may serve as an immutable log for loyalty point transactions and registrations.

Blockchain 102 may be maintained in a peer-to-peer network that is private, consortium and/or public in nature (ETHEREUM®, HYPERLEDGER® Fabric, etc.). Consortium and private networks may offer improved control over the content of the blockchain and public networks may leverage the cumulative computing power of the network to improve security. In that regard, blockchain 102 may be implemented using technologies such as, for example, ETHEREUM® GETH, eth-lightwallet, or other suitable or future blockchain interface technologies.

In various embodiments, blockchain 102 may be maintained by consensus participants 103 in the form of computing devices configured to validate blocks of the blockchain. Loyalty point network 100 comprises a plurality of blockchain API hosts 104 that communicate with blockchain 102 in response to receiving API calls from various other computing devices and systems seeking to read from or write to blockchain 102. Blockchain API hosts 104 and other computing devices described herein may take the form of a computer or processor, or a set of computers, processor, and/or application specific integrated circuits (ASICs), although other types of computing units or systems may be used. Exemplary computing devices may include servers, pooled servers, laptops, notebooks, hand held computers, personal digital assistants, cellular phones, smart phones (e.g., IPHONE®, BLACKBERRY®, ANDROID®, etc.), tablets, wearables (e.g., smart watches, smart glasses, etc.), interne of things (IoT) devices, or any other device capable of receiving data over a network. Each computing device may run applications to interact with blockchain 102, communicate with other devices, perform crypto operations, and otherwise operate within loyalty point network 100. For example, each computing device may run a client application that can be a thin client (web), a hybrid (e.g., web and native, such as APPLE® iOS and ANDROID®), or a native application to make application programming interface (API) calls to blockchain API host 104 and interact with blockchain 102, such as a web3 API compatible with blockchain databases maintained by ETHEREUM®.

In various embodiments, blockchain API hosts 104 may host an outward facing API 108 accessible by communication over a network such as, for example, a LAN, a WAN, the internet, and/or any other suitable type of network discussed herein.

In various embodiments, API 108 may serve as a blockchain interface accessible by applications and computing devices of loyalty point network 100. API 108 may be implemented using technologies such as, for example, ETHEREUM® GETH, eth-lightwallet, or other suitable blockchain interface technologies. Loyalty wallets 105 may communicate with blockchain API host 104 using API 108. Loyalty wallet 105 may check loyalty point balances, adjust loyalty point balances, transfer loyalty points, register a user or device, or otherwise manipulate loyalty points as allowed by loyalty point network 100. Loyalty wallet 105A, for example, may run on a mobile device to enable customer 109 to interact with blockchain 102 and his or her loyalty points.

In various embodiments, merchants that accept loyalty points from loyalty point network 100 as a form of payment may host loyalty partner sites 106 on computing devices. Customer 109 may browse or search loyalty partner site 106 for items in a manner similar to typical ecommerce sites. Once customer 109 has selected items for purchase, customer 109 may purchase the items using loyalty points. Loyalty partner sites 106 may thus communicate with blockchain 102 through blockchain API host 104 using API 108 to complete purchase transactions using loyalty points.

In various embodiments, currency exchange sites 107 may exchange loyalty points from customer 109 into fiat currency. Currency exchange sites may include web sites hosted on computing devices remote from customer 109 and/or brick and mortar locations such as currency exchange stores. Currency exchange sites 107 may communicate with blockchain 102 through blockchain API host 104 using API 108.

In various embodiments, loyalty point network 100 may include controls to restrict access to registered loyalty partner sites 106 and/or currency exchange sites 107. Certificate authority 112 may allow participants to join loyalty point network 100 or may disallow would-be participants from joining loyalty point network 100. Certificate authority may communicate with blockchain 102 through consensus participants 103 of blockchain 102 using an API 108. Certificate authority 112 may include a web interface for review of new currency exchange sites by currency exchange candidate staff 113. Similarly, certificate authority 112 may include a web interface for review of new loyalty partner sites by loyalty coalition candidate staff 111. The staff members may thus approve or deny candidates for joining loyalty point network 100. Validation may include verifying of proof of identity such as, for example, phone number, employer ID, SSN, or any sensitive information that known by the employees of the respective entity.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10 BASE-T, 100 BASE-T, 1000 BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels, such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Referring now to FIGS. 2-9 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-9, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Figure 2:
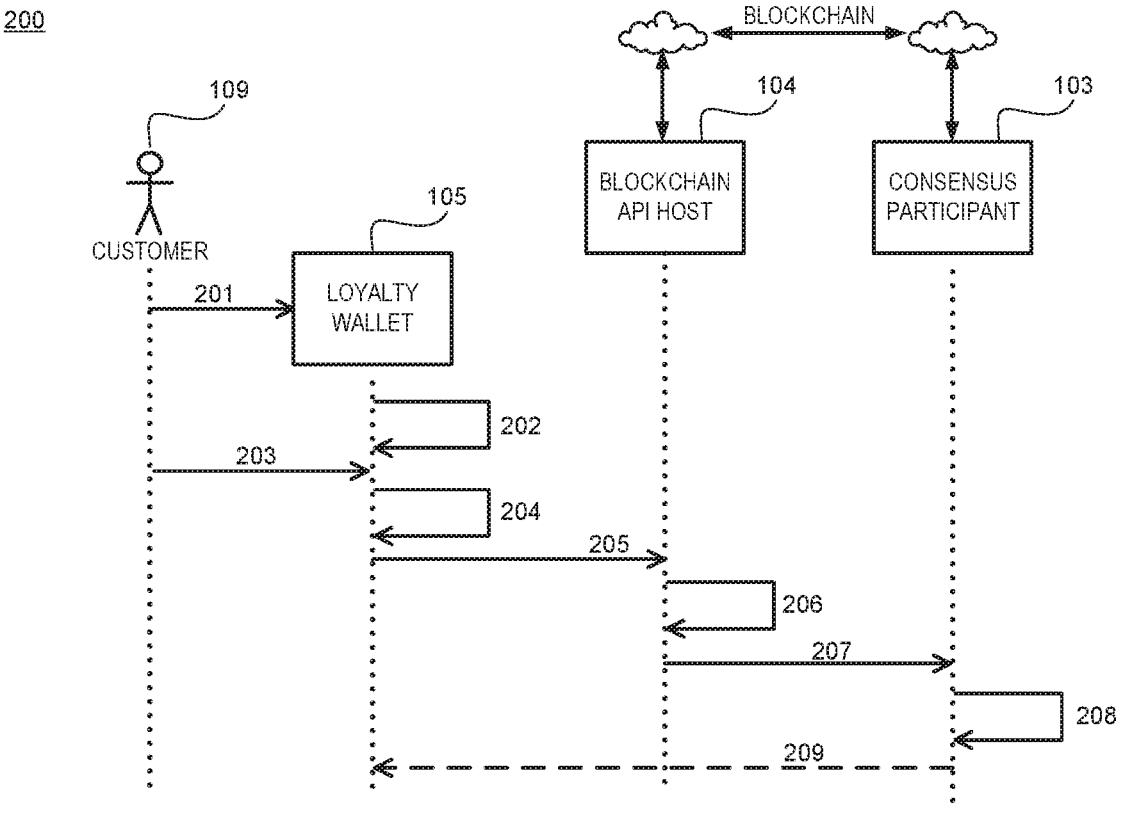
FIG. 2 illustrates a process for registering users for a payment network for loyalty points using a blockchain-based ledger, in accordance with various embodiments.

Referring to FIG. 2, an exemplary registration process 200 is shown for loyalty point network 100, in accordance with various embodiments. Customer 109 may download and install a loyalty wallet 105 on his or her mobile device (Step 201). Loyalty wallet 105 may be in electronic communication with blockchain API host 104 over a network. Loyalty wallet 105 may generate and/or receive an asymmetric cryptography key pair including a private key paired with a public key (Step 202). Loyalty wallet 105 may display a mnemonic seed and password selection screen to customer 109, and it may use BIP32, BIP39, BIP44, or another key generation technique to create public keys (e.g., blockchain addresses) and private keys, which may be encrypted and stored locally on the customer's computing device.

In various embodiments, loyalty wallet 105 may encrypt the private key and securely store the private key for later use. Loyalty wallet 105 may also collect personal information from customer 109 (Step 203). A registration form may, for example, include fields for customer 109 to enter a user name and enter a password. Customer 109 may enter user credentials comprising a user ID, password, and any other information entered into the registration form of loyalty wallet 105.

In various embodiments, loyalty wallet 105 may prepare and sign a registration request for transmission to a blockchain API host 104 (Step 204). The registration request may include the personal information of customer 109 (collected in step 203), the public key (generated in step 202), an application ID, a device ID, an account number, or other information germane to registration. In that regard, the blockchain address may be associated with the customer's loyalty point account. The signature may be a crypto operation performed with the private key from the asymmetric key pair (generated in step 202). Loyalty wallet 105 may transmit the registration request to blockchain API host 104 (Step 205). Loyalty wallet 105 may make an API call to transmit the registration request.

In various embodiments, blockchain API host 104 may verify the signature and prepare a proposal to register customer 109 (Step 206). Blockchain API host 104 may verify the signature by performing a crypto operation using the public key to the data that was signed using the private key. Blockchain API host 104 may propagate the registration proposal to consensus participants 103 (Step 207). Blockchain API host 104 may propagate the registration proposal by writing it to the blockchain or by otherwise transmitting the proposal to consensus participants 103. Consensus participants 103 may achieve consensus and add a new ledger for customer 109 to blockchain 102 (Step 208). Consensus participants 103 may validate registrations, loyalty point transactions, and any other activity on blockchain 102 by establishing consensus between the participants based on proof of work, proof of stake, practical byzantine fault tolerance, delegated proof of stake, or other suitable consensus algorithms. Consensus participants 103 may notify loyalty wallet 105 of successful registration by transmitting a confirmation, or by loyalty wallet locating the registration written on blockchain 102 (Step 209).

Figure 3:
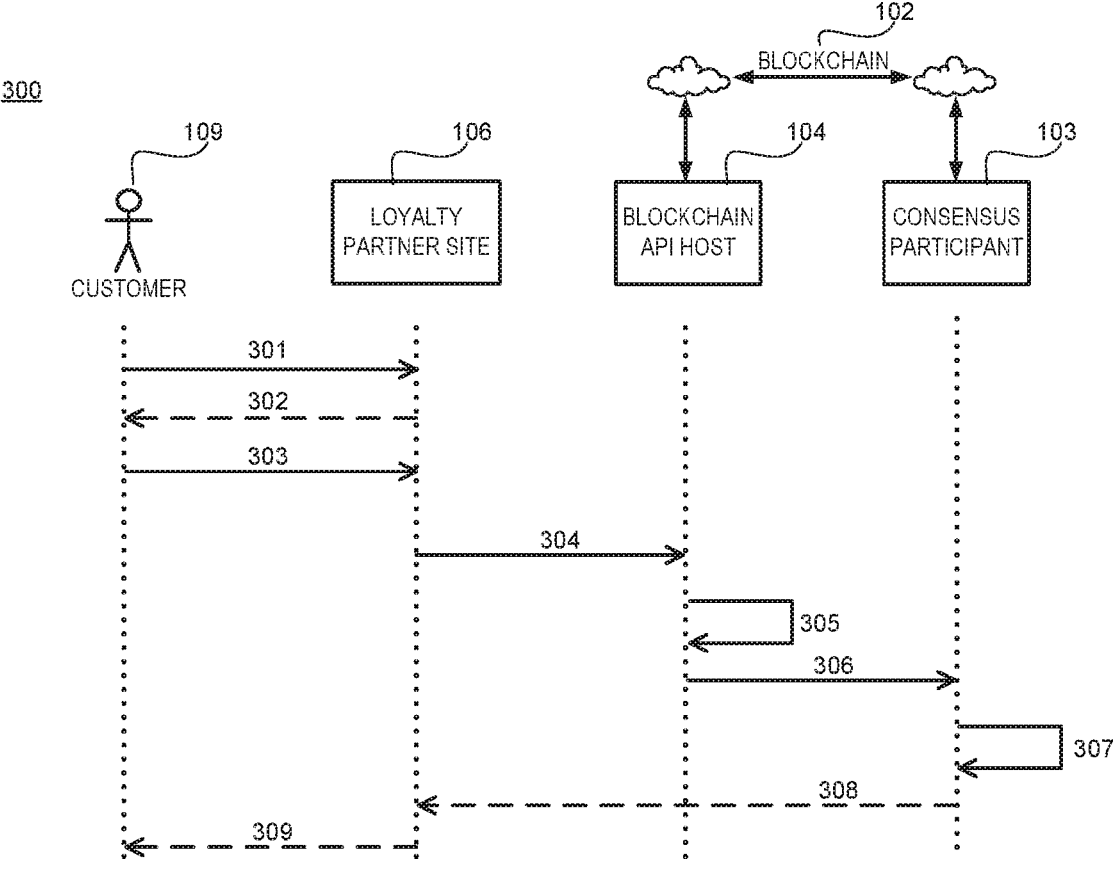
FIG. 3 illustrates a process for shopping for loyalty point purchases on a website hosted by a merchant that accepts loyalty points as payment, in accordance with various embodiments.

With reference to FIG. 3, process 300 is shown for shopping for on loyalty point network 100, in accordance with various embodiments. Customer 109 shops with a loyalty partner by browsing loyalty partner site 106 (Step 301). Loyalty partner site 106 may prompt customer 109 and/or loyalty wallet 105 for the corresponding loyalty account at checkout (Step 302). The loyalty account may be identifiable by a universally unique identifier (UUID), for example. Customer 109 may provide the loyalty account (Step 303) in response to the prompt by entering the loyalty account and/or by loyalty wallet 105 transmitting the loyalty account.

In various embodiments, loyalty partner site 106 may transmit a point adjustment request to blockchain API host 104 (Step 304) using an API call. Blockchain API host 104 may execute a smart contract (Step 305) in response to receiving the API request to adjust a point balance. Blockchain API host 104 may also send adjustment request to the network of consensus participants 103 (Step 306). Consensus participants 103 may achieve consensus and thus new entry to blockchain 102 (Step 307). Consensus participants 103 may notify loyalty partner site 106 (Step 308) of the completed balance adjustment. Consensus participants 103 may also notify customer 109 (Step 309) of the completed balance adjustment.

Figure 4:
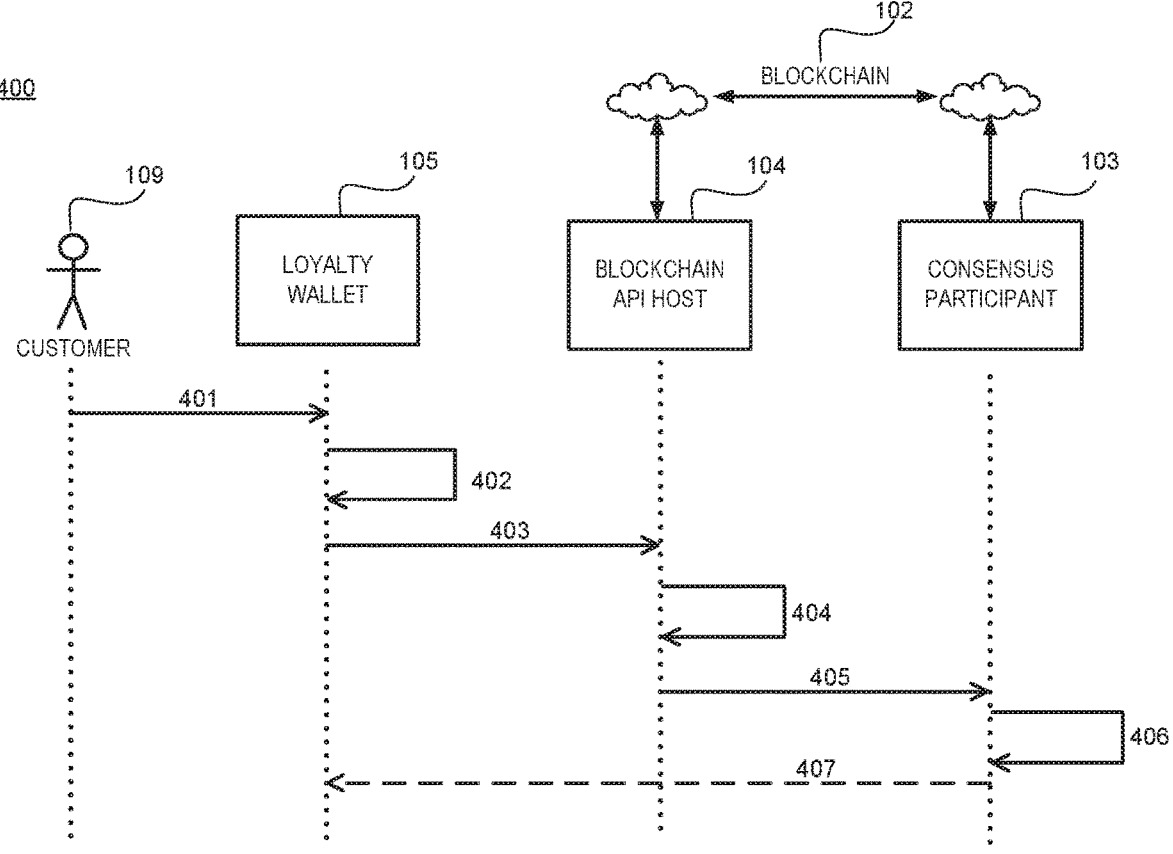
FIG. 4 illustrates a process for checking a loyalty point balance on a blockchain-based ledger, in accordance with various embodiments.

With reference to FIG. 4, a process 400 is shown for checking a loyalty point balance in loyalty point network 100, in accordance with various embodiments. Customer 109 request his or her loyalty point balance in loyalty wallet 105 (Step 401). Loyalty wallet 105 may prepare and/or sign the request (Step 402). Loyalty wallet 105 may sign the request by performing a crypto operation with a private key from an asymmetric cryptographic key pair as described above. Loyalty wallet 105 may transmit the signed request to blockchain API host 104 (Step 403).

In various embodiments, blockchain API host 104 may validate the signature and prepare a proposal to inquire point balance (Step 404). Blockchain API host 104 may validate the signature by performing a cryptographic operation using the public key on the data what was encrypted by loyalty wallet 105 using the corresponding private key. Blockchain API host 104 may prepare the proposal by preparing data for writing to a block of the blockchain including, for example, an identifier of the customer (e.g., the public key or blockchain address), the transaction (e.g., a balance inquiry), the requesting party, a timestamp, or any other data for inclusion in the blockchain.

In various embodiments, blockchain API host 104 may propagate the proposal to consensus participants 103 by transmitting the proposal and/or writing the proposal to blockchain 102 (Step 405). Consensus participants 103 may achieve consensus and add the proposal to the blockchain 102 (Step 406). The consensus participants 103 and/or blockchain API host 104 may notify customer 109 by writing to blockchain 102 and/or transmitting a confirmation and/or a balance to loyalty wallet 105 (Step 407).

Figure 5:
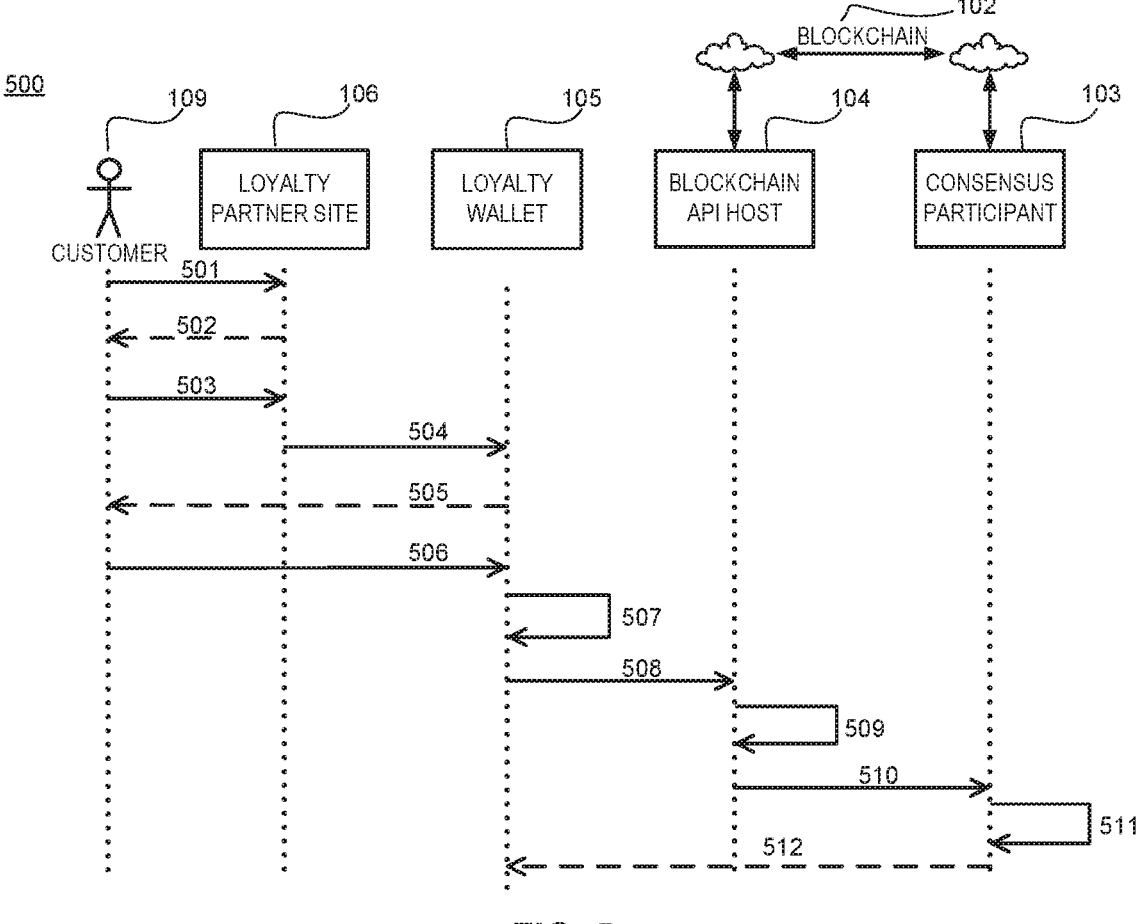
FIG. 5 illustrates a process for a user to spend their loyalty points, in accordance with various embodiments.

Referring now to FIG. 5, a process 500 is shown for spending loyalty points with a loyalty partner site 106 of loyalty point network 100, in accordance with various embodiments. Customer 109 may shop on a loyalty partner site 106 using a website or native application (Step 501). Loyalty partner site 106 may host a checkout page (Step 502). The checkout page may offer various payment methods such as credit, ACH, gift cards, and loyalty points, for example. Customer 109 may select loyalty points as a payment method on loyalty partner site 106 (Step 503).

In response to the selection of loyalty points as a payment method, a computing device may open loyalty wallet 105 installed on the computing device by a deep link (Step 504). A deep link allows a first application running on a computing device to launch a second application installed on the computing device and/or pass data from the first application to the second application. For example, web browsers running on mobile devices often launch an application store to facilitate installation of a particular application on the mobile device. Here, the deep link triggered by selecting points as a payment method may launch loyalty wallet 105 and send as parameters the merchant blockchain account (e.g., the merchant's public key) and the amount of purchase.

In various embodiments, the computing device may prompt for a security password to access loyalty wallet 105 (Step 505), and the computing device may receive and/or authenticate the password from customer 109 (Step 506). The password may be in the form of a pin, passcode, password, biometric identifier, one-time password, or other data suitable for authenticating customer 109. Loyalty wallet 105 may decrypt the private key stored on the computing device and sign a request to pay loyalty partner site 106 using loyalty points (Step 507). The request may include the data passed to loyalty wallet 105 by the deep link in response to loyalty partner site 106 launching loyalty wallet 105. For example, the request may include the merchant's blockchain address and the amount of purchase.

In various embodiments, loyalty wallet 105 may send the payment request to blockchain API host 104 (Step 508). Blockchain API host 104 may validate the signature in response to receiving the request by performing a cryptographic operation using the public key on the data that was encrypted by loyalty wallet 105 using the corresponding private key. Blockchain API host 104 may prepare the proposal by preparing data for writing to a block of the blockchain including, for example, the customer's blockchain address (e.g., the public key), the transaction (e.g., a payment), a transaction amount, the merchant's blockchain address, a timestamp, or any other data for inclusion in the blockchain.

In various embodiments, blockchain API host 104 may propagate the proposal to consensus participants 103 by transmitting the proposal and/or writing the proposal to blockchain 102 (Step 510). Consensus participants 103 may achieve consensus and add the proposal to the blockchain 102 (Step 511). The consensus participants 103 and/or blockchain API host 104 may thus notify customer 109 by writing data from the proposal to blockchain 102 and/or transmitting a confirmation to loyalty wallet 105 (Step 512). Once written to the blockchain, the data from the proposal updates the account balance for customer 109 by removing the amount of loyalty points spent with loyalty partner site 106.

Figure 6:
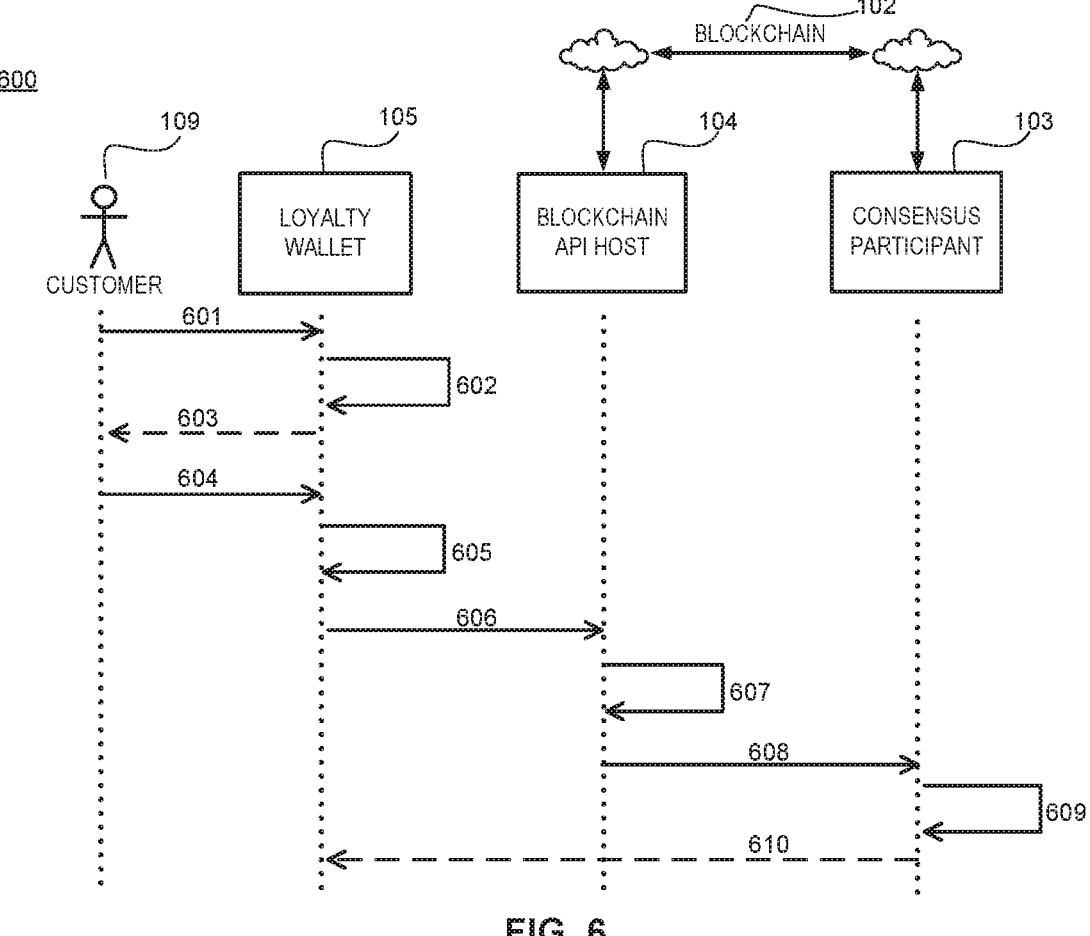
FIG. 6 illustrates a process for peer-to-peer loyalty point transfer using a blockchain-based leger, in accordance with various embodiments.

With reference to FIG. 6, a process 600 is shown for peer-to-peer transfer of loyalty points in loyalty point network 100, in accordance with various embodiments. Customer 109 may request a peers' account (Step 601). The account may be sent to the customer via a message or email, for example, and may come in the form of the peer's public key, UUID, and/or blockchain address. Loyalty wallet 105 may fetch the peer's address (Step 602). For example, loyalty wallet 105 may scan a communication channel to identify the account, may allow customer 109 to enter the account, or may communicate with a loyalty wallet belonging to the peer to receive the account.

In various embodiments, loyalty wallet 105 running on the customer's computing device may prompt customer 109 for a security password (Step 603), and the computing device may receive and/or authenticate the password from customer 109 (Step 604). The password may be in the form of a pin, passcode, password, biometric identifier, one-time password, or other data suitable for authenticating customer 109. Loyalty wallet 105 may decrypt the private key stored on the computing device and sign a request to transfer loyalty points to the peer's account (Step 605). The request may include, for example, the peer's account and the amount of points for transfer to the peer.

In various embodiments, loyalty wallet 105 may send the transfer request to blockchain API host 104 (Step 606). Blockchain API host 104 may validate the signature and prepare a proposal in response to receiving the request (Step 607). Blockchain API host 104 may validate the signature by performing a cryptographic operation using the public key on the data that was encrypted by loyalty wallet 105 using the corresponding private key. Blockchain API host 104 may also prepare a transfer proposal by preparing data for writing to a block of the blockchain with the data including, for example, the customer's blockchain address (e.g., the public key), the transaction (e.g., a transfer), the peer's account (e.g., blockchain address), a timestamp, the transfer amount, or any other data for inclusion in the blockchain.

In various embodiments, blockchain API host 104 may propagate the proposal to consensus participants 103 by transmitting the proposal and/or writing the proposal to blockchain 102 (Step 608). Consensus participants 103 may achieve consensus and add the proposal to the blockchain 102 (Step 609). The consensus participants 103 and/or blockchain API host 104 may thus notify customer 109 by writing data from the proposal to blockchain 102 and/or transmitting a confirmation to loyalty wallet 105 (Step 610). Once written to the blockchain, the data from the proposal updates the account balances for customer 109 and the peer by transferring the requested amount of loyalty points from the customer's account to the peer's account.

Figure 7:
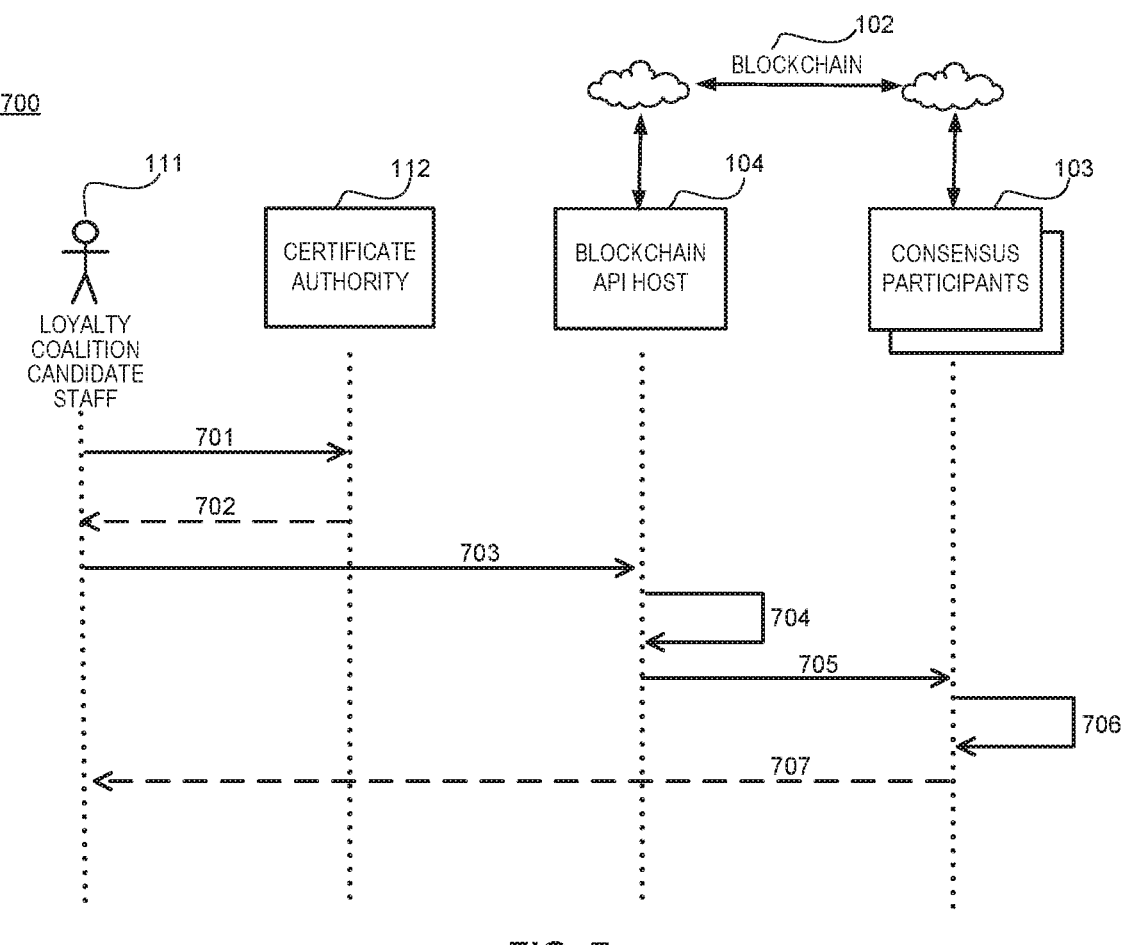
FIG. 7 illustrates a process for adding a loyalty coalition member to a blockchain-based loyalty point system, in accordance with various embodiments.

With reference to FIG. 7, process 700 is shown for adding a loyalty coalition member such as a new loyalty partner, in accordance with various embodiments. The candidate staff 111 may register an entity with certificate authority 112 (Step 701). Certificate authority 112 may respond by providing certificates and/or private keys to the loyalty coalition candidate staff 111 (Step 702). Loyalty coalition candidate staff may prepare a request to add the entity as a new coalition member, sign the request, and transmit the request to blockchain API host 104 (Step 703). The request may be signed by performing a cryptographic operation on all or part of the request using the private key received from the certificate authority 112.

In various embodiments, blockchain API host 104 may verify the signature by performing a cryptographic operation on the signed data using the public key corresponding to the entity's private key (Step 704). Blockchain API host 104 may also prepare a proposal to add the entity to loyalty point network 100. Blockchain API host 104 may propagate the proposal to consensus participants 103 by transmitting the proposal and/or writing the proposal to blockchain 102 (Step 705). Consensus participants 103 may achieve consensus and add the proposal to the blockchain 102 (Step 706). The consensus participants 103 and/or blockchain API host 104 may thus notify loyalty coalition candidate staff 111 by writing data from the proposal to blockchain 102 and/or transmitting a confirmation to loyalty wallet 105 (Step 707). Once written to the blockchain, the data from the proposal adds the entity to the loyalty payment network of network 100.

Figure 8:
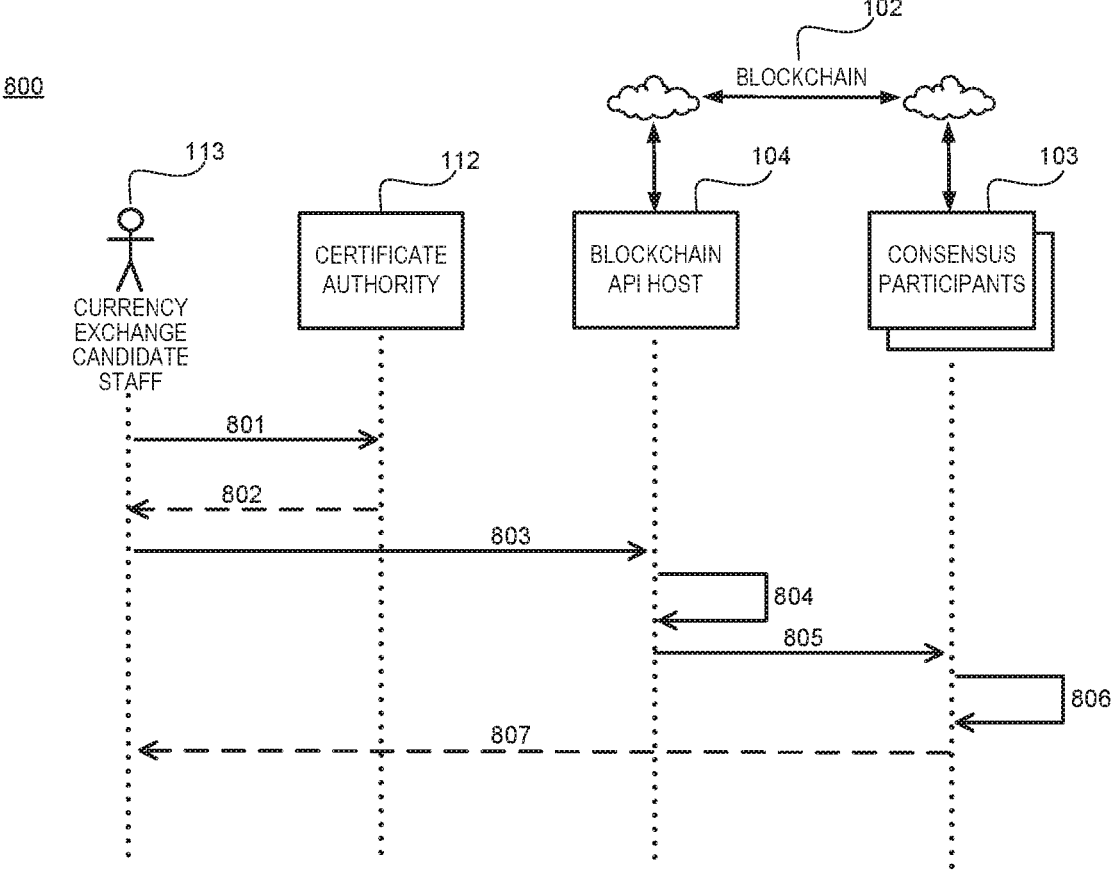
FIG. 8 illustrates a process for adding a currency exchange to a blockchain-based loyalty point system, in accordance with various embodiments.

With reference to FIG. 8, a process 800 for adding a currency exchange to loyalty point network 100 is shown, in accordance with various embodiments. The candidate staff 113 working on behalf of the registering entity may register an entity with certificate authority 112 (Step 801). Certificate authority 112 may respond by providing certificates and/or private keys to the currency exchange candidate staff 113 (Step 802). Currency exchange candidate staff 113 may prepare a request to add the entity as a currency exchange, sign the request, and transmit the request to blockchain API host 104 (Step 803). The request may be signed by performing a cryptographic operation on all or part of the request using the private key received from the certificate authority 112.

In various embodiments, blockchain API host 104 may verify the signature by performing a cryptographic operation on the signed data using the public key corresponding to the entity's private key (Step 804). Blockchain API host 104 may also prepare a proposal to add the entity to loyalty point network 100 as a currency exchange. Blockchain API host 104 may propagate the proposal to consensus participants 103 by transmitting the proposal and/or writing the proposal to blockchain 102 (Step 805). Consensus participants 103 may achieve consensus and add the proposal to the blockchain 102 (Step 806). The consensus participants 103 and/or blockchain API host 104 may thus notify currency exchange candidate staff 113 by writing data from the proposal to blockchain 102 and/or transmitting a confirmation to loyalty wallet 105 (Step 807). Once written to the blockchain, the data from the proposal adds the entity to the loyalty payment network of network 100 as a currency exchange.

Figure 9:
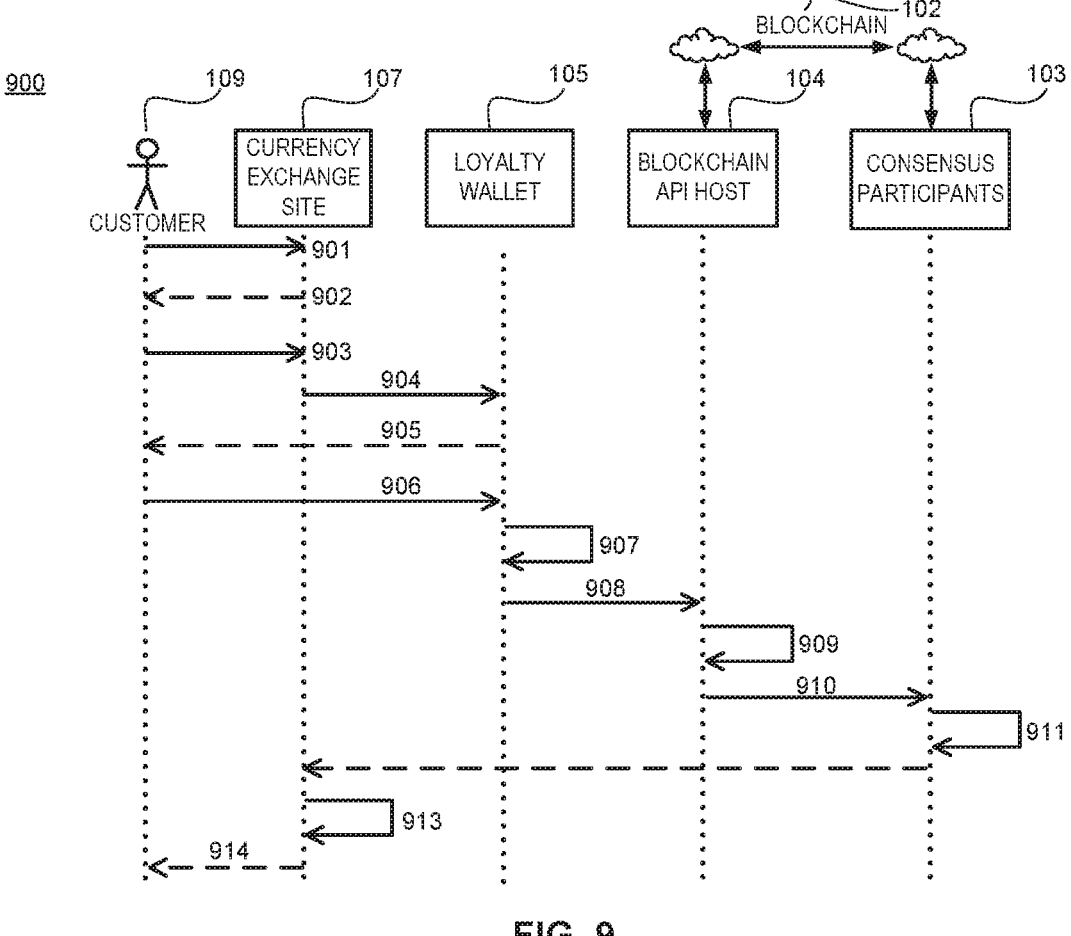
FIG. 9 illustrates a process for exchanging loyalty points for fiat currency, in accordance with various embodiments.

Referring now to FIG. 9, a process 900 is shown for exchanging loyalty points for fiat currency in loyalty point network 100, in accordance with various embodiments. Customer 109 accesses on a currency exchange site 107 using a website or native application to request a currency exchange rate (Step 901). Currency exchange site 107 may provide exchange rates from loyalty points into one or more fiat currencies and/or from fiat currencies into loyalty points (Step 902). Customer 109 may provide to currency exchange site 107 exchange information in requesting the currency exchange (Step 903). The exchange information may include destination account for the fiat currency, ACH details, currency type, currency amount, or other data.

In response to the request for a currency exchange, a computing device may open loyalty wallet 105 installed on the computing device by a deep link (Step 904). The deep link triggered by requesting a currency exchange from points to fiat currency may launch loyalty wallet 105 and send as parameters the requested fiat currency type, the requested fiat currency amount, the amount of loyalty points to exchange, and/or the account of the currency exchange (e.g., the exchange's public key, UUID).

In various embodiments, the computing device may prompt for a security password to access loyalty wallet 105 (Step 905), and the computing device may receive and/or authenticate the password from customer 109 (Step 906). The password may be in the form of a pin, passcode, password, biometric identifier, one-time password, or other data suitable for authenticating customer 109. Loyalty wallet 105 may decrypt the private key stored on the computing device and sign a request to exchange currency with currency exchange site 107 (Step 907). The request may include the data passed to loyalty wallet 105 by the deep link in response to currency exchange site 107 launching loyalty wallet 105. For example, the request may include the exchange's account, the amount of loyalty points to exchange, and the fiat currency type.

In various embodiments, loyalty wallet 105 may send the exchange request to blockchain API host 104 (Step 908). Blockchain API host 104 may validate the signature in response to receiving the request by performing a cryptographic operation using the public key on the data that was encrypted by loyalty wallet 105 using the corresponding private key (Step 909). Blockchain API host 104 may prepare the proposal by preparing data for writing to a block of the blockchain including, for example, the customer's blockchain address (e.g., the public key), the transaction (e.g., a currency exchange), an exchange amount, the merchant's blockchain address, a timestamp, or any other data for inclusion in the blockchain.

In various embodiments, blockchain API host 104 may propagate the proposal to consensus participants 103 by transmitting the proposal and/or writing the proposal to blockchain 102 (Step 910). Consensus participants 103 may achieve consensus and add the proposal to the blockchain 102 (Step 911). The consensus participants 103 and/or blockchain API host 104 may thus notify the currency exchange by writing data from the proposal to blockchain 102 and/or transmitting a confirmation to currency exchange site 107 (Step 912). Once written to the blockchain, the data from the proposal updates the account balance for customer 109 by removing the amount of loyalty points exchanged with currency exchange site 107. The currency exchange may credit the bank account identified to currency exchange site 107 with the fiat currency amount (Step 913). The currency exchange may use an ACH transfer to credit customer 109 with the account and transfer information entered by customer 109 (in Step 903). Currency exchange site 107 may notify loyalty wallet 105 in response to completion of the exchange (Step 914). The notification may take the form of a text message, email, or push notification, for example.

Figure 10:
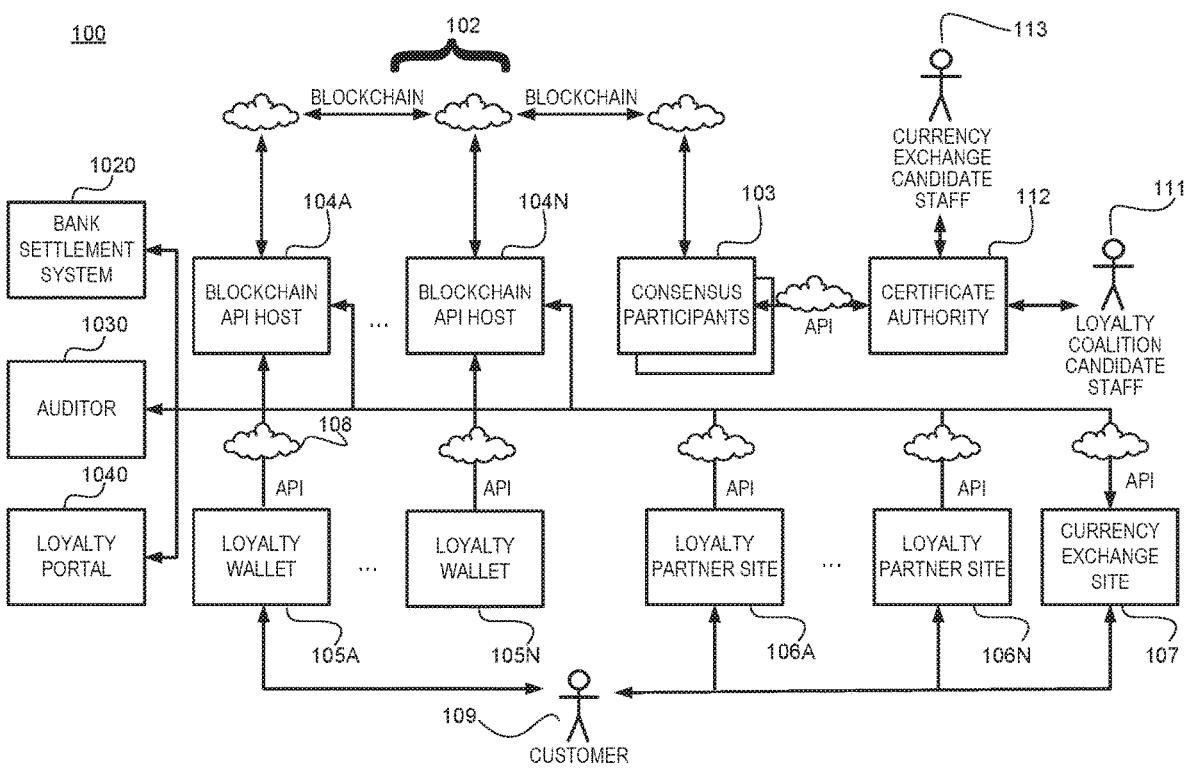
FIG. 10 illustrates a loyalty point or digital currency system configured for multi-merchant loyalty point partnerships, in accordance with various embodiments.

In various embodiments, and with reference to FIG. 10, loyalty point network 100 may also be configured to facilitate multi-merchant loyalty point partnerships. Merchants (e.g., loyalty partners) may desire to create partnerships with one or more other merchants to incentivize customers 109 to purchase goods or services at each merchant joined in the partnership. For example, merchants in a common industry (e.g., hotel, airline, etc.) may form a partnership to incentivize customers to purchase from one or more merchants in the industry. Loyalty point network 100 may incentivize partner merchants and/or customers 109 by providing a partnership reward, such as a loyalty point payout, in response to customer 109 purchasing goods or services at each merchant, in accordance with the partnership.

The loyalty point network 100 may enable SKU-level based rewards bonusing with merchant partners, partner discounts and/or the loyalty partner credits by rewarding partners, merchants and/or customers 109. In response to customer 109 conducting a purchase transaction for goods or services at a merchant, the merchant may acquire a bar code, UPC and/or SKU from the product or packaging. The UPC and/or SKU may be in the form of a bar code, data, QR code or other code or symbol. The UPC and/or SKU may be scanned by the merchant POS to acquire the data from the product. The UPC and/or SKU may include data about the product, the merchant, the manufacturer, contents, health data, etc. Such data (or any subset of such data) may be used to determine a loyalty point amount or payout to customer 109 and/or to a merchant. For example, the SKU data may disclose that the customer purchased 3 WILSON® tennis rackets. The manufacturer WILSON® or the merchant selling the product (or any other entity in the supply chain) may agree to provide or fund a certain amount of reward points (for the partner, merchant and/or customer) based on buying 2 or more Wilson tennis rackets during a certain timeframe or for a certain price, etc. For more information about SKU based rewards, see U.S. Pat. Nos. 8,065,182, 8,024,220, 7,813,955, 7,672,870, 7,613,628, 7,496,524, 7,428,498, 7,398,226 and 7,398,225, all of which are hereby incorporated by reference in their entirety for all purposes.

For example, travel merchants may desire to create partnerships centered around a travel package (e.g., purchase a flight from merchant A, a hotel from merchant B, a dinner at merchant C, a rental car from merchant D, etc.). As discussed further herein, a merchant may invoke a smart contract and may specify one or more merchants, or desired characteristics of partner merchants, to form a partnership. The smart contract may set forth the purchase requirements at each merchant, a partnership duration (e.g., a day, a week, a month, etc.), parameters for the loyalty point payout or reward, and any other desired parameter. In response to a customer 109 completing at least a portion of the purchase requirements at each merchant (or a subset of the merchants), customer 109 may receive at least a portion of the loyalty point payout or other reward. Customer 109 may redeem the loyalty points at various loyalty partner sites 106, or may exchange the loyalty points into a fiat or cryptocurrency, as previously discussed.

In various embodiments, loyalty point network 100 may comprise a loyalty portal 1040. Loyalty portal 1040 may be configured to enable merchants to create and/or join various multi-merchant loyalty point partnerships, as discussed further herein. Loyalty portal 1040 may comprise software, a mobile application, a web interface, or the like. Loyalty portal 1040 may be accessible to loyalty partners directly via a graphical user interface ("GUI") in a web browser, native application, or the like. Loyalty portal 1040 may include one or more software modules, logic engines, various databases, interfaces to systems and tools, and/or computer networks. In various embodiments, loyalty portal 1040 may be integrated into, or be in electronic communication with, one or more social media platforms (e.g., FACEBOOK®, INSTAGRAM®, LINKEDIN®, PINTEREST®, QZONE®, SNAPCHAT®, TWITTER®, VKontakte (VK), etc.). For example, each merchant may input one or more social media account identifiers (e.g., username and password) into loyalty portal 1040 to enable access and communication between loyalty portal 1040 and the social media platform. In that respect, and as discussed further herein, merchants may interact with each other via the one or more social media platforms to form multi-merchant partnerships, as discussed further herein.

Loyalty portal 1040 may comprise a local contract repository. The local contract repository may comprise any suitable database, data structure, file, or the like configured to store and maintain various partnership smart contract templates. In that regard, one or more loyalty partners may access loyalty portal 1040 to retrieve partnership smart contract templates. The loyalty partner may input various partnership parameters into the partnership smart contract template, as discussed further herein, to generate a partnership smart contract. The partnership smart contract may control the end-to-end data flow in loyalty point network 100 and may autonomously govern the multi-merchant loyalty point partnership by supporting execution and recording of various data, as discussed further herein. The partnership smart contract may comprise executables that write data to blockchain 102 in a predetermined format based on predetermined function parameters passed by an API call or the like, as discussed further herein. For example, the partnership smart contract may include a program written in a programming language such as, for example, Solidity, or any other suitable smart contract programming language.

Loyalty portal 1040 may comprise a local partner repository. The local partner repository may comprise any suitable database, data, structure, file, or the like configured to store and maintain data regarding loyalty partners participating in multi-merchant partnerships (e.g., participant data). The participant data may comprise data corresponding to each local partner, including partner characteristics, partner preferences, or the like. For example, partner characteristics may comprise the partner identifier, the partner industry category, the partner industry subcategory, a partner reputation, the partner history, the partner geographic, the partner goods or services sold, or the like. The partner preferences may comprise data regarding partnerships the loyalty partner desires to join, such as, for example, the type of purchase reward (e.g., partner discount, loyalty point payout, loyalty partner credit, etc.), the partnership duration, the purchase amount, or the like. The participant data may be grouped by each partner identifier in the local partner repository.

In various embodiments, loyalty portal 1040 may also comprise a reputation ledger. The reputation ledger may comprise any suitable database, data, structure, file, or the like configured to store and maintain reputation data regarding one or more loyalty partners. The reputation data may be generated based on merchant reviews, customer reviews, or the like, and may comprise a reputation score having any suitable scale. In that respect, merchants may access loyalty portal 1040 and may review or rate one or more other merchants in loyalty point network 100. In various embodiments, the reputation ledger may also be stored and maintained on blockchain 102, using any suitable technique discussed herein.

In various embodiments, loyalty point network 100 may comprise a bank settlement system 1020. Bank settlement system 1020 may be configured to authorize and settle various transactions in loyalty point network 100. Bank settlement system 1020 may comprise any suitable combination of hardware, software, and/or database components. For example, bank settlement system 1020 may comprise one or more network environments, servers, computer-based systems, processors, databases, and/or the like. Bank settlement system 1020 may comprise at least one computing device in the form of a computer or processor, or a set of computers and/or processors, although other types of computing units or systems may be used, such as, for example, a server, web server, pooled servers, or the like. Bank settlement system 1020 may also include one or more data centers, cloud storages, or the like, and may include software, such as APIs, configured to perform various operations discussed herein.

In various embodiments, bank settlement system 1020 may comprise or interact with a traditional payment network or transaction network to facilitate purchases and payments, authorize transactions, settle transactions, and the like. For example, bank settlement system 1020 may represent existing proprietary networks that presently accommodate transactions for credit cards, debit cards, and/or other types of transaction accounts or transaction instruments. Bank settlement system 1020 may be a closed network that is secure from eavesdroppers. In various embodiments, bank settlement system 1020 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network, transaction network, or the like. Bank settlement system 1020 may include systems and databases related to financial and/or transactional systems and processes, such as, for example, one or more authorization engines, authentication engines and databases, settlement engines and databases, accounts receivable systems and databases, accounts payable systems and databases, and/or the like. In various embodiments, bank settlement system 1020 may also comprise a transaction account issuer's Credit Authorization System ("CAS") capable of authorizing transactions, as discussed further herein.

Although the present disclosure makes reference to bank settlement system 1020, it should be understood that principles of the present disclosure may be applied to a system having any suitable number of bank settlement systems, issuer systems, payment networks, or the like. For example, loyalty point network 100 may comprise one or more bank settlement system 1020 each corresponding to or associated with a different issuer system or network.

In various embodiments, loyalty point network 100 may comprise an auditor 1030. Auditor 1030 may comprise any suitable combination of hardware, software, and/or database components. For example, auditor 1030 may comprise one or more network environments, servers, computer-based systems, processors, databases, and/or the like. In various embodiments, auditor 1030 may be computer based, and may comprise a processor, a tangible non-transitory computer-readable memory, and/or a network interface, along with other suitable system software and hardware components. Instructions stored on the tangible non-transitory memory may allow auditor 1030 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like.

Auditor 1030 may comprise software, a mobile application, a web interface, or the like. For example, auditor 1030 may include a graphical user interface ("GUI"), software modules, logic engines, interfaces to systems and tools, and/or the like. Auditor 1030 may be configured to enable one or more third parties, systems, or the like access to loyalty point network 100 to review and audit the multi-merchant partnerships, loyalty point distributions, and the like. For example, auditor 1030 may be granted read-only access to any desired amount of transactions in loyalty point network 100, as well as current balances (e.g., loyalty partner balances, user balances, etc.) and the state of relationships between loyalty partners.

Figure 11:
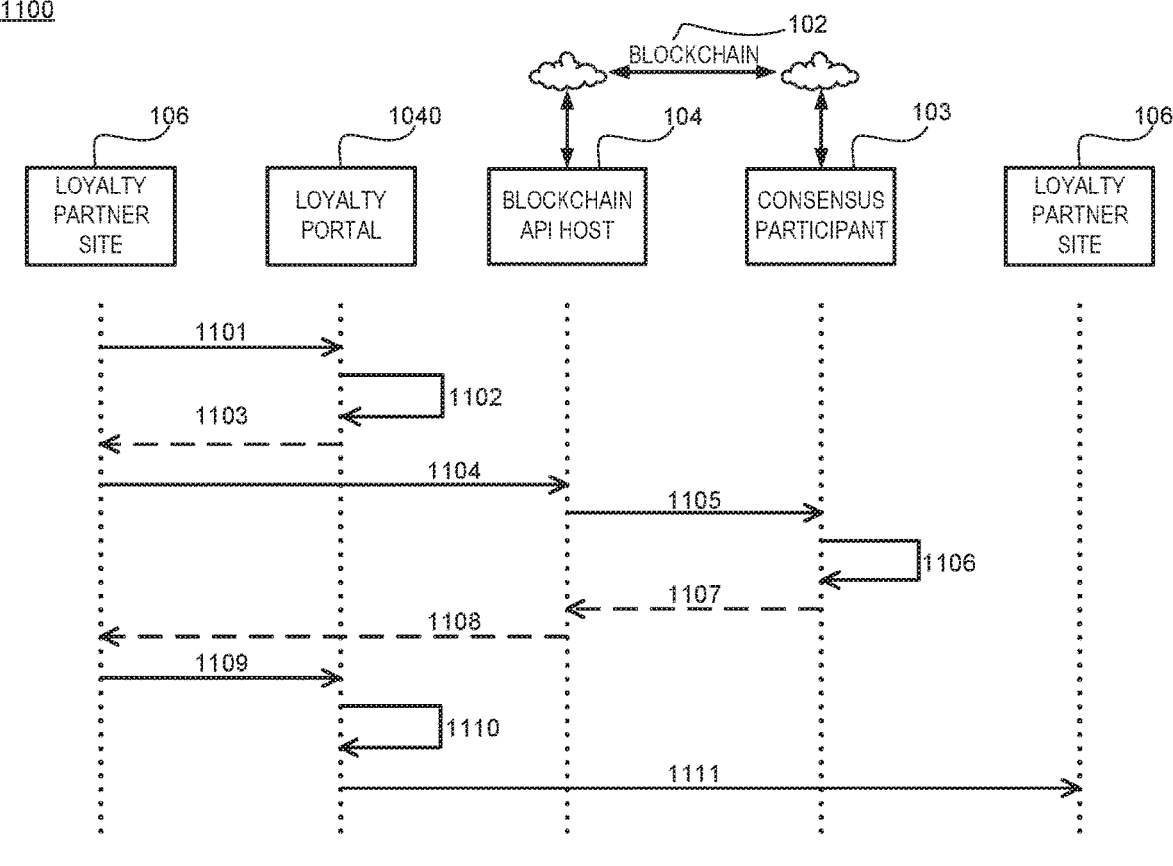
FIG. 11 illustrates a process for generating a multi-merchant loyalty point partnership construct, in accordance with various embodiments.
Figure 12:
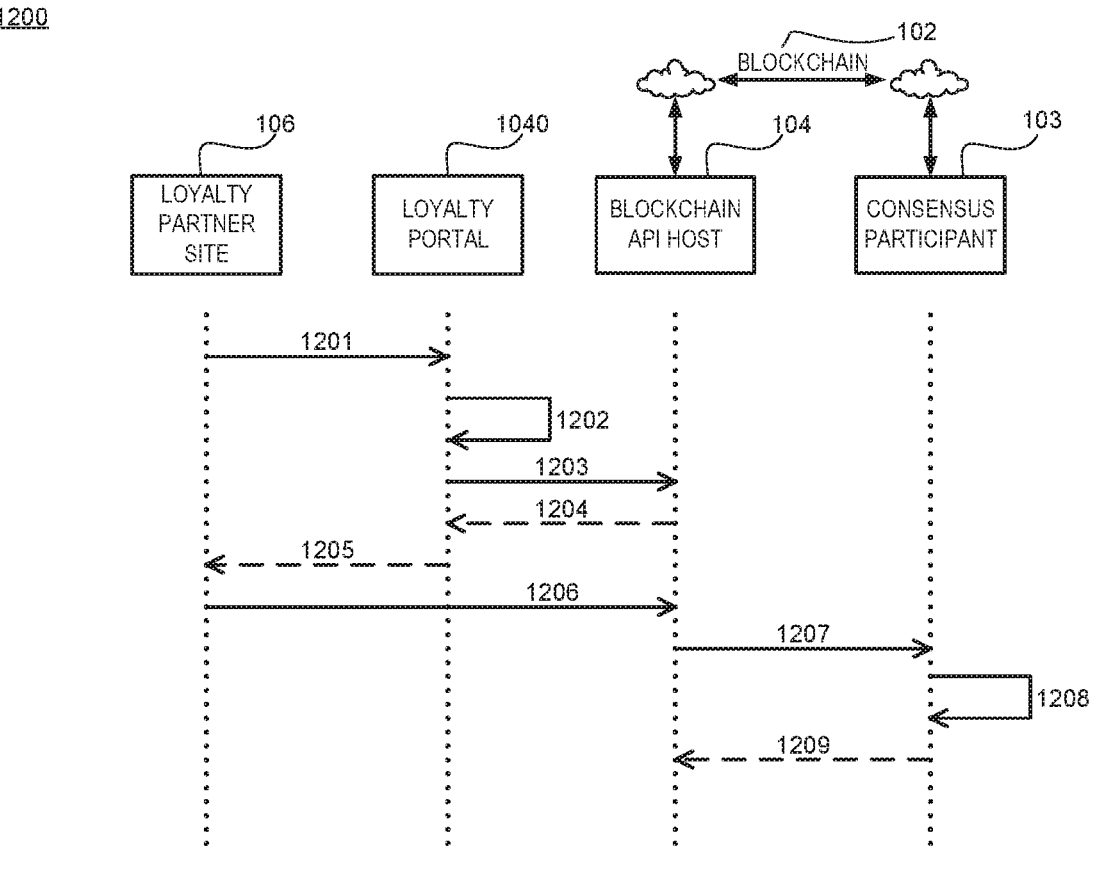
FIG. 12 illustrates a process for enrolling a partner in a multi-merchant loyalty point partnership, in accordance with various embodiments.
Figure 13:
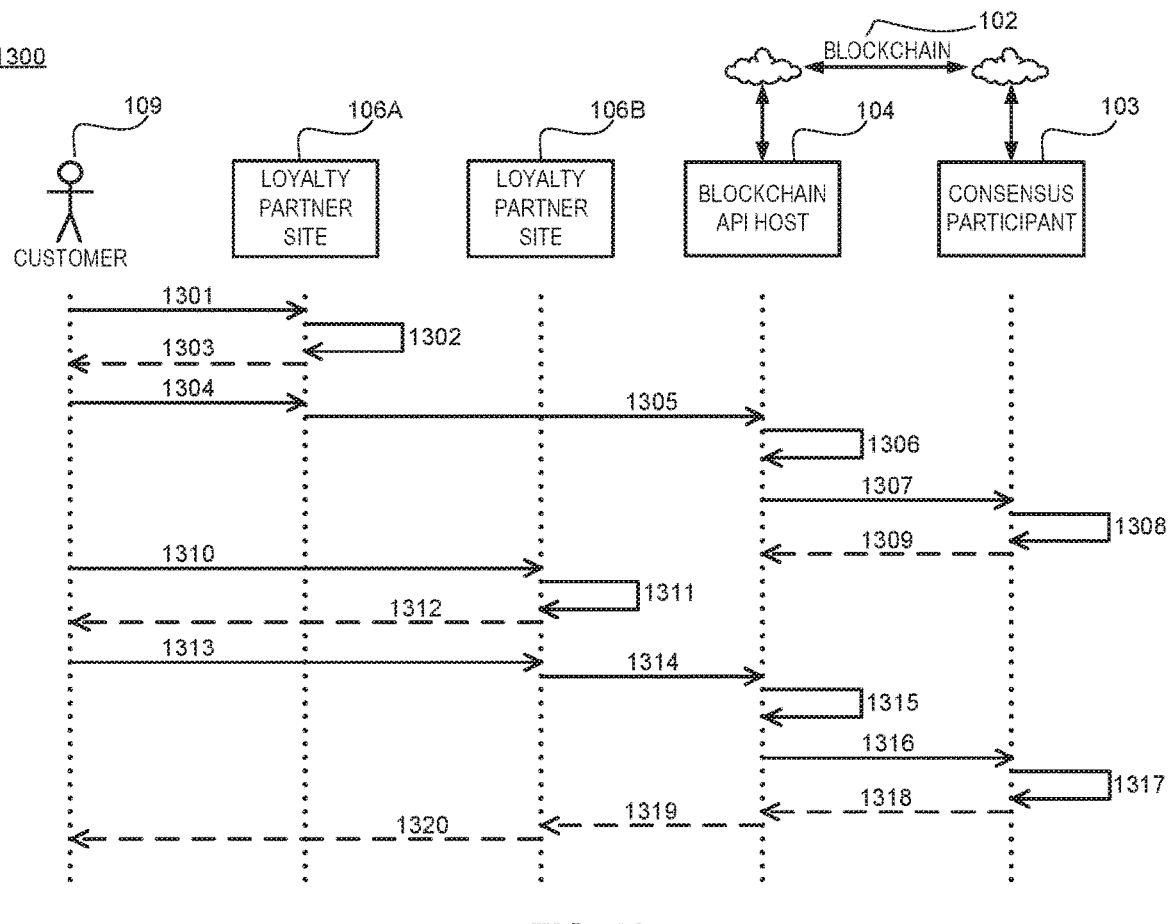
FIG. 13 illustrates a process for customer-completion of the multi-merchant loyalty point partnership, in accordance with various embodiments.

Referring now to FIGS. 11-13 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 11-13, but also to the various system components as described above with reference to FIG. 10. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the figures and described below.

With specific reference to FIG. 11, and in accordance with various embodiments, a process 1100 for generating a multi-merchant loyalty point partnership arrangement is disclosed. A loyalty partner (e.g., a first merchant) may generate the multi-merchant loyalty point partnership construct to specify various desired parameters of the partnership, as discussed further herein. The loyalty partner may preregister with the system as a loyalty coalition member (e.g., process 700, with brief reference to FIG. 7). In various embodiments, the multi-merchant loyalty point partnership construct may comprise a smart contract (e.g., a partnership smart contract) configured to control end-to-end data flows (or any portion thereof) in the system based on the various specified parameters.

In various embodiments, the loyalty partner (e.g., via loyalty partner site 106) accesses loyalty portal 1040 (Step 1101). Access to loyalty portal 1040 may be controlled using any suitable access control, such as, for example, loyalty partner credentials (e.g., username, password, biometric input, etc.), one-time passwords, or the like. The loyalty partner may access loyalty portal 1040 to initiate the generation of a partnership smart contract (e.g., by interacting with a user interface (UI)). For example, the loyalty partner may initiate the generation of the partnership smart contract by selecting and/or inputting various desired partnership parameters such as, for example, the number of partners in the partnership (e.g., an exact number, a minimum number, a maximum number, a varying number based on certain factors, etc.), desired partnership industries (e.g., travel, hotel, etc.), or the like. In response to the loyalty partner initiating the generation, loyalty portal 1040 retrieves a partnership smart contract template (Step 1102) from the local contract repository. Loyalty portal 1040 returns the partnership smart contract template (Step 1103) to the loyalty partner (e.g., via loyalty partner site 106).

In response to receiving the partnership smart contract template, the loyalty partner may input and/or select various partnership parameters to be included in the partnership smart contract. For example, partnership parameters may include qualifying participant parameters, purchase requirement parameters, SKU-based rewards (as set forth herein), purchase reward parameters, partnership duration parameters, or the like. The qualifying participant parameters may comprise data corresponding to desired loyalty partner participants such as, for example, a partner identifier (e.g., blockchain address, ID, etc.), a partner industry category (e.g., travel), a partner industry subcategory (e.g., hotel), a partner reputation requirement (e.g., based on a reputation ledger, YELP® reviews, GOOGLE® reviews, a Better Business Bureau (BBB®) accreditation, etc.), a partner history (e.g., length of existence in loyalty point network 100, length of loyalty partner business existence, etc.), a partner geographic location (e.g., United States, New York, New York City, etc.), or the like. The purchase requirement parameters may comprise data corresponding to the goods or services that need to be purchased at each loyalty partner to complete at least a portion of the partnership smart contract. The purchase requirement parameters may define the purchase requirements for each individual loyalty partner in the partnership, or may define collective requirements (a subset or all of the partners). For example, the purchase requirement parameters may comprise a good or service type, a geographic restriction (e.g., all purchases must be completed within New York City), a purchase amount (e.g., a minimum purchase amount), or the like. The purchase reward parameters may define the payout or reward a customer earns in response to completing the partnership smart contract. For example, the purchase reward parameters may comprise a partner discount (e.g., a future discount at one or more of the loyalty partners, a retroactive discount at one or more of the loyalty partners, etc.), a loyalty point payout (e.g., 500 loyalty points), a loyalty partner credit (e.g., a credit applied to the customer's transaction account), or the like. The partnership duration parameter may define the duration of the partnership smart contract, such as, for example, a time period, an expiration date, a maximum number of completed contracts, or the like.

The various partnership parameters may be input into the partnership smart contract template to generate the partnership smart contract. In various embodiments, the loyalty partner requests creation of the partnership smart contract with blockchain API host 104 (Step 1104). For example, the loyalty partner (via loyalty partner site 106) may invoke blockchain API host 104 by transmitting the partnership smart contract to blockchain API host 104. In response to being invoked, blockchain API host 104 propagates the partnership smart contract to consensus participants 103 (Step 1105) by transmitting the partnership smart contract to consensus participants 103 and/or by writing the partnership smart contract to blockchain 102. In various embodiments, the partnership smart contract write may also comprise data regarding the loyalty partner (e.g., as the first loyalty partner in the partnership), such as, for example, a partner identifier or the like.

Consensus participants 103 achieve consensus and add the partnership smart contract to blockchain 102 (Step 1106). Consensus participants 103 may achieve consensus using proof of work, proof of stake, practical byzantine fault tolerance, delegated proof of stake, or other suitable consensus algorithm. Consensus participants 103 may write the partnership smart contract to blockchain 102 using any suitable technique. In response to achieving consensus and completing the write, consensus participants 103 transmit a write confirmation to blockchain API host 104 (Step 1107). The write confirmation may comprise data indicating that the partnership smart contract was successfully written to blockchain 102. In various embodiments, the write confirmation may also comprise data pointing to the location of the write on blockchain 102, such as a uniform resource locator (URL), or the like. In response to receiving the write confirmation, blockchain API host 104 transmits the write confirmation to the loyalty partner (Step 1108), such as, for example, via loyalty partner site 106.

The loyalty partner (e.g., via loyalty partner site 106) requests participant notification with loyalty portal 1040 (Step 1109), based on the partnership parameters of the partnership smart contract. For example, the loyalty partner, via loyalty partner site 106, may transmit the partnership parameters and/or the partnership smart contract to loyalty portal 1040. Loyalty portal 1040 retrieves qualifying participant data from local partner repository (Step 1110), based on the partnership parameters and/or the partnership smart contract. For example, the local partner repository may store participant data for each loyalty partner in the system. The participant data may comprise data corresponding to each local partner, including partner characteristics, partner preferences, or the like. For example, partner characteristics may comprise the partner identifier, the partner industry category, the partner industry subcategory, a partner reputation, the partner history, the partner geographic, the partner goods or services sold, or the like. The partner preferences may comprise data regarding partnerships the loyalty partner desires to join, such as, for example, the type of purchase reward (e.g., partner discount, loyalty point payout, loyalty partner credit, etc.), the partnership duration, the purchase amount, or the like. The participant data may be grouped by each partner identifier.

In that regard, loyalty portal 1040 may locate one or more loyalty partners comprising participant data that at least partially matches the partnership parameters. Loyalty portal 1040 broadcasts a partnership notification to qualifying participants (Step 1111). The partnership notification may comprise data corresponding to the partnership smart contract, such as, for example, a blockchain URL (e.g., the location of the partnership smart contract in blockchain 102), the partnership parameters, or the like. In various embodiments, loyalty portal 1040 may also broadcast the partnership notification to all participants in the system.

With specific reference to FIG. 12, and in accordance with various embodiments, a process 1200 for enrolling a partner in a multi-merchant loyalty point partnership is disclosed. A loyalty partner may desire to enroll in one or more multi-merchant loyalty point partnership. The loyalty partner (e.g., via loyalty partner site 106) requests active partnership smart contracts from loyalty portal 1040 (Step 1201). For example, the loyalty partner may request one or more active partnership smart contracts in response to receiving the partnership notification in Step 1111. As a further example, the loyalty partner may request the active partnership smart contracts to browse and review various available and active partnership smart contracts. In that regard, the request may comprise a request for a specific partnership smart contract (e.g., based on the blockchain URL) or a general request for one or more active partnership smart contracts.

In response to receiving the request, loyalty portal 1040 retrieves partner data from local partner repository (Step 1202) corresponding to the loyalty partner. For example, loyalty portal 1040 may retrieve the partner data based on the partner identifier. Loyalty portal 1040 invokes blockchain API host 104 (Step 1204) to return qualifying active partnership smart contracts. For example, loyalty portal 1040 may invoke blockchain API host 104 by transmitting the partner data to blockchain API host 104. In various embodiments, loyalty portal 1040 may also invoke blockchain API host 104 by transmitting the blockchain URL. In response to being invoked, blockchain API host 104 retrieves and returns qualifying active partnership smart contracts to the loyalty partner (e.g., via loyalty partner site 106) (Step 1205).

In that regard, and in accordance with various embodiments, blockchain API host 104 may retrieve the specific partnership smart contract based on the blockchain URL. In various embodiments, blockchain API host 104 may also retrieve one or more active partnership smart contracts based on the partner data. For example, blockchain API host 104 may retrieve partnership smart contracts having partnership parameters that at least partially match the partner data retrieved in Step 1202. Blockchain API host 104 may return the one or more partnership smart contracts to the loyalty partner, via loyalty partner site 106.

In response to receiving the partnership smart contracts, the loyalty partner may review the partnership smart contracts to determine whether the loyalty partner desires to enroll in one or more partnership smart contracts. The loyalty partner (e.g., via loyalty partner site 106) invokes blockchain API host 104 by transmitting a partnership enrollment request (Step 1206). The partnership enrollment request may comprise data indicating the partnership smart contract that the loyalty partner desires to enroll in (e.g., by blockchain URL, smart contract ID, etc.), partner data (e.g., a partner identifier, etc.), or the like. In response to being invoked, blockchain API host 104 propagates the partnership enrollment request to consensus participants 103 (Step 1207) by transmitting the partnership enrollment request to consensus participants 103 and/or by writing the enrollment request to blockchain 102.

Consensus participants 103 achieve consensus and add the enrollment request to blockchain 102 (Step 1208). Consensus participants 103 may achieve consensus using proof of work, proof of stake, practical byzantine fault tolerance, delegated proof of stake, or other suitable consensus algorithm. Consensus participants 103 may write the partnership smart contract to blockchain 102 using any suitable technique. In response to achieving consensus and completing the write, consensus participants 103 transmit an update write confirmation to blockchain API host 104 (Step 1209).

In response to the partnership smart contract completing loyalty partner enrollment (e.g., in response to the specified number of partners in the partnership being met), the partnership smart contract may mark the partnership as active.

With specific reference to FIG. 13, and in accordance with various embodiments, a process 1300 for customer-completion of a multi-merchant loyalty point partnership is disclosed. In various embodiments, customer 109 may be aware of the loyalty point partnership prior to shopping at the loyalty partners. For example, the loyalty point partnership may be advertised, customer 109 may be directly notified, or the like. In various embodiments, customer 109 may be unaware of the loyalty point partnership prior to shopping at the loyalty partners. In that regard, customer 109 may still receive the purchase reward (e.g., partner discount, loyalty point payout, loyalty partner credit, etc.), in response to completing the requirements of the loyalty point partnership.

Customer 109 shops with a first loyalty partner by browsing loyalty partner site 106A (Step 1301). For example, customer 109 may browse loyalty partner site to select one or more products or services. Loyalty partner site 106A retrieves product data (Step 1302) based on customer 109 selections. Customer 109 may continue to select product and/or services, or may proceed with the checkout process. In response to customer 109 initiating the checkout process, loyalty partner site 106A may prompt customer 109 to select a payment method, such as, for example, using a transaction account, customer loyalty points, gift cards, or any other suitable payment type. In response to customer 109 selecting loyalty points, loyalty partner site 106A prompts customer 109, and/or loyalty wallet 105, for the corresponding loyalty account at checkout (Step 1303). The loyalty account may be identifiable by a universally unique identifier (UUID), for example. Customer 109 provides the loyalty account (Step 1304) in response to the prompt by entering the loyalty account and/or by loyalty wallet 105 transmitting the loyalty account. Customer 109 may also input or select various payment information and preferences, such as, for example, shipping information, billing information, or the like. In response to customer 109 inputting and/or selecting various payment preferences, loyalty partner site 106A may communicate with bank settlement system 1020 to authorize, settle, and/or complete the transaction.

In response to completing the purchase, loyalty partner site 106A invokes blockchain API host 104 (step 1305) by transmitting the loyalty account and/or transaction data (e.g., products or services purchased, transaction total, etc.). In various embodiments, access to blockchain API host 104 may be provided to each loyalty partner by an independent cloud service provider offering blockchain as a service (BaaS) functionality (e.g., via a paid service subscription or the like). In response to being invoked, blockchain API host 104 executes the partner smart contract. The partner smart contract may validate whether the transaction data from the completed purchase meets the various partnership parameters. In response to the transaction data qualifying, the partner smart contract records the transaction (step 1306). For example, the partner smart contract records the loyalty account, and a tag, note, or the like indicating that a qualifying purchase was completed with the loyalty account. In response to customer 109 selecting to at least partially complete the purchase using loyalty points, partner smart contract may also adjust the loyalty point balance (see step 305 of FIG. 3).

Blockchain API host 104 propagates the transaction record write to consensus participants 103 by transmitting the transaction record write to consensus participants 103 and/or by writing the transaction record write to blockchain 102 (step 1307). Consensus participants 103 achieve consensus and add the transaction record to the blockchain 102 (Step 1308). Consensus participants 103 may achieve consensus using proof of work, proof of stake, practical byzantine fault tolerance, delegated proof of stake, or other suitable consensus algorithm. Consensus participants 103 may write the transaction record to blockchain 102 using any suitable technique. In response to achieving consensus and completing the write, consensus participants 103 transmit a transaction record confirmation to blockchain API host 104 (step 1309). The transaction record confirmation may comprise data indicating that the transaction record was successfully written to blockchain 102. In various embodiments, the transaction record confirmation may also comprise data pointing to the location of the write on blockchain 102, such as a uniform resource locator (URL), or the like. Consensus participants 103 may also notify customer 109 of the completed loyalty point balance adjustment.

In various embodiments, customer 109 shops with a second loyalty partner by browsing loyalty partner site 106B (Step 1310). The second loyalty partner may be a second partner in the partnership smart contract. For example, customer 109 may browse loyalty partner site 106B to select one or more products or services. Loyalty partner site 106B retrieves product data (step 1311) based on customer 109 selections. Customer 109 may continue to select products and/or services, or may proceed with the checkout process. In response to customer 109 initiating the checkout process, loyalty partner site 106B may prompt customer 109 to select a payment method, such as, for example, using a transaction account, customer loyalty points, gift cards, or any other suitable payment type. In response to customer 109 selecting loyalty points, loyalty partner site 106B prompts customer 109, and/or loyalty wallet 105, for the corresponding loyalty account at checkout (Step 1312). Customer 109 provides the loyalty account (Step 1313) in response to the prompt by entering the loyalty account and/or by loyalty wallet 105 transmitting the loyalty account. Customer 109 may also input or select various payment information and preferences, such as, for example, shipping information, billing information, or the like. In response to customer 109 inputting and/or selecting various payment preferences, loyalty partner site 106B may communicate with bank settlement system 1020 to authorize, settle, and/or complete the transaction.

In response to completing the purchase, loyalty partner site 106B invokes blockchain API host 104 (Step 1314) by transmitting the loyalty account and/or transaction data (e.g., products or services purchased, transaction total, etc.). In response to being invoked, blockchain API host 104 executes the partner smart contract. The partner smart contract may validate whether the transaction data from the completed purchase meets the various partnership parameters. In response to the transaction data qualifying, the partner smart contract records the transaction (Step 1315). For example, the partner smart contract records the loyalty account, and a tag, note, or the like indicating that a qualifying purchase was completed with the loyalty account. In response to customer 109 selecting to at least partially complete the purchase using loyalty points, partner smart contract may also adjust the loyalty point balance (see Step 305 of FIG. 3). Consensus participants 103 may also notify customer 109 of the completed loyalty point balance adjustment.

Blockchain API host 104 propagates the transaction record write to consensus participants 103 by transmitting the transaction record write to consensus participants 103 and/or by writing the transaction record write to blockchain 102 (Step 1316). Consensus participants 103 achieve consensus and add the transaction record to the blockchain 102 (Step 1317). Consensus participants 103 may achieve consensus using proof of work, proof of stake, practical byzantine fault tolerance, delegated proof of stake, or other suitable consensus algorithm. Consensus participants 103 may write the transaction record to blockchain 102 using any suitable technique. In response to achieving consensus and completing the write, consensus participants 103 transmit a transaction record confirmation to blockchain API host 104 (step 1318). The transaction record confirmation may comprise data indicating that the transaction record was successfully written to blockchain 102. In various embodiments, the transaction record confirmation may also comprise data pointing to the location of the write on blockchain 102, such as a uniform resource locator (URL), or the like. Consensus participants 103 may also notify customer 109 of the completed loyalty point balance adjustment.

In various embodiments, in response to receiving the transaction record confirmation, blockchain API host 104 may execute the partner smart contract to update the loyalty account corresponding to customer 109 in the partnership smart contract. The partner smart contract may determine that customer 109 has completed the requirements of the partnership parameters, such as, for example in response to customer 109 completing a qualifying purchase at each of the loyalty partners partnered in the partner smart contract. In response to the purchase reward being a loyalty point payout, blockchain API host 104 may adjust the loyalty point balance of customer 109 using any suitable technique, such as, for example using process 300, with brief reference to FIG. 3. Blockchain API host 104 transmits the transaction record confirmation and/or a partnership completion notification to loyalty partner site 106B (Step 1319). The partnership completion notification may comprise data corresponding to the purchase reward, and/or any other suitable data regarding the completion of the partnership.

Loyalty partner site 106B notifies customer 109 of completion of the multi-merchant loyalty point partnership (Step 1320). In response to the purchase reward being the loyalty point payout, the customer notification may also comprise the loyalty point payout amount and the completed balance adjustment. In response to the purchase reward being a partner discount or a loyalty partner credit, the customer notification may comprise data indicating the amount of the partner discount or the loyalty partner credit.

In various embodiments, auditor 1030 may be granted access to blockchain 102 (and/or to an audit log of writes to blockchain 102). Auditor 1030 may be configured to access and retrieve the writes, such as, for example, by migrating the data to a dedicating audit database. Auditor 1030 may perform various analytical processing on the data as required by desired or suitable auditing needs.

Figure 14:
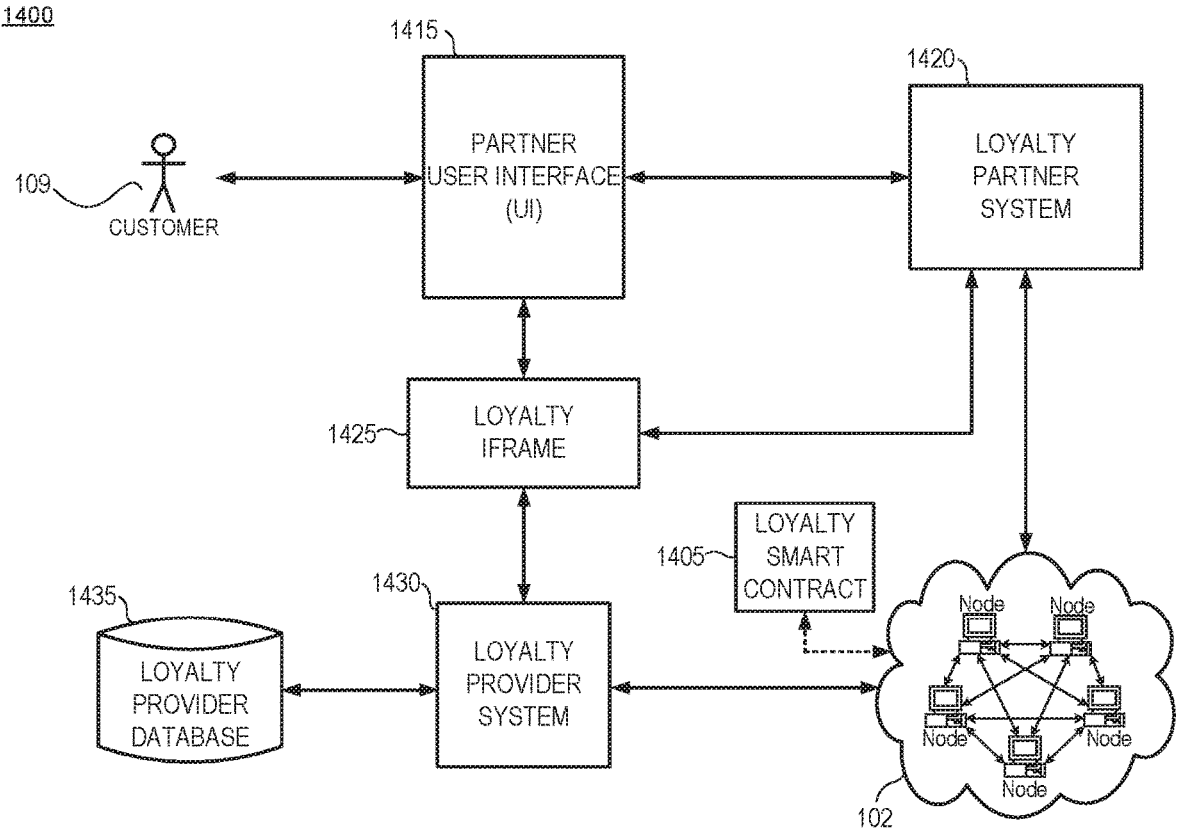
FIG. 14 illustrates a loyalty point or digital currency system configured for loyalty point distributions using a decentralized loyalty ID, in accordance with various embodiments.

In various embodiments, and with brief reference again to FIGS. 1 and 10, loyalty point network 100 may also be configured to provide decentralized loyalty IDs. For example, with reference to FIG. 14, a system 1400 for loyalty point distributions using a decentralized loyalty ID is disclosed.

By enabling use of decentralized loyalty IDs, system 1400 may allow loyalty partners to participate in a loyalty program without needing to establish an independent loyalty program. Further, the decentralized loyalty ID may enable system 1400 to provide loyalty rewards based on transactions (e.g., purchases, goods or services purchased, multimerchant loyalty point partnerships completed, etc.) and based on non-transaction events, such as, for example, behavioral interactions. Loyalty partners may desire to offer rewards to customers based on interactions completed by the customer. For example, loyalty partners may desire to offer loyalty rewards based on a specific interaction (e.g., completion of a survey), a milestone (e.g., based on fitness tracker data, frequent visits to a website, etc.), or any other suitable or desired behavioral activity. For example, and in accordance with various embodiments, a loyalty reward may be attributed based on activities performed by the customer. For example, a loyalty partner may collect information such as a pedometer counter of number of steps (e.g., via a pedometer equipped device), an enrollment to a loyalty partner's promotional email list, and/or the like, and provide a loyalty reward based on the collected information (e.g., every 10,000 counted steps is worth 10 loyalty points).

In various embodiments, as a result of new channels of loyalty program participation being enabled, loyalty providers (e.g., loyalty provider system 1430) may have access to additional channels of data. For example, system 1400 may enable loyalty providers to track a full life-cycle of customer 109 activity, including transaction-based and non-transaction-based activities. In various embodiments, wherein the loyalty provider is a financial institution, the additional data channels may allow the loyalty provider to increase customer satisfaction and improve internal processes by forming a better understanding of the full life-cycle of customer 109.

The decentralized loyalty ID may comprise any unique identifier associated with a customer 109. For example, the decentralized loyalty ID may comprise a public key (e.g., as generated in process 200, with brief reference to FIG. 2), a blockchain address (e.g., associated with a loyalty wallet 105), a unique identifier ID, a user name or ID, and/or the like. The decentralized loyalty ID may be assigned to the customer 109 during a registration process (e.g., process 200, with brief reference to FIG. 2).

In various embodiments, blockchain 102 may be configured to store and maintain loyalty point distributions using the decentralized loyalty IDs. For example, blockchain 102 may maintain one or more loyalty point ledgers comprising loyalty point balances, distributions, uses, and the like for a customer 109. As a further example, blockchain 102 may maintain one or more loyalty partner balances associated with various loyalty partner systems 1420, as discussed further herein. In various embodiments, blockchain 102 may be similar to blockchain 102 as discussed in association with FIGS. 1 and 11. In various embodiments, blockchain 102 may be a distributed database that maintains records in a readable manner and that is resistant to tampering. Blockchain 102 may be based on blockchain technologies such as, for example, ETHEREUM®, Open Chain, Chain Open Standard, HYPERLEDGER® Fabric, CORDA CONNECT®, INTEL® Sawtooth, etc. Blockchain 102 may comprise a ledger of interconnected blocks containing data. Each block may link to the previous block and may include a timestamp. The blocks can hold file transfer data, smart contract data, and/or other information as desired. Each block may link to the previous block and may include a timestamp. Blockchain 102 may be maintained on various blockchain nodes (e.g., consensus participants 103, with brief reference to FIGS. 1 and 11), and may be maintained in the form of copies or partial copies of the blockchain 102, as discussed further herein. Blocks may be written to blockchain 102 by establishing consensus between the blockchain nodes. For example, consensus may be established based on proof of work, proof of stake, practical byzantine fault tolerance, delegated proof of stake, or other suitable consensus algorithms. When implemented in support of system 1400, the blockchain may serve as an immutable log for loyalty point transactions using decentralized loyalty IDs.

Blockchain 102 may be maintained in a peer-to-peer network that is private, consortium and/or public in nature (ETHEREUM®, HYPERLEDGER® Fabric, etc.). Consortium and private networks may offer improved control over the content of the blockchain and public networks may leverage the cumulative computing power of the network to improve security. In that regard, blockchain 102 may be implemented using technologies such as, for example, ETHEREUM® GETH, eth-lightwallet, or other suitable or future blockchain interface technologies.

In various embodiments, blockchain 102 may implement smart contracts that enforce data workflows in a decentralized manner. For example, system 1400 may comprise a loyalty smart contract 1405. Loyalty smart contract 1405 may be configured to write data to blockchain 102, including, for example updates and writes to the loyalty point ledgers and loyalty partner balances maintained on blockchain 102, as discussed further herein. In various embodiments, loyalty smart contract 1405 may also be configured to store and maintain local copies of the loyalty point ledgers and loyalty partner balances. Loyalty smart contract 1405 may comprise executables that write data to blockchain 102 in a predetermined format based on predetermined function parameters passed by an API call or the like, as discussed further herein. For example, loyalty smart contract 1405 may include a program written in a programming language such as, for example, Solidity, or any other suitable smart contract programming language.

In various embodiments, system 1400 may comprise a loyalty partner system 1420 and a loyalty provider system 1430 configured to write and retrieve data from blockchain 102.

Loyalty partner system 1420 may be in electronic communication with customer 109, via a partner user interface (UI) 1415, a loyalty iFrame 1425, and/or blockchain 102. In various embodiments, the electronic communication between loyalty partner system 1420 and blockchain 102 may include various components configured to enable loyalty partner system 1420 to communicate with blockchain 102, such as, for example, a blockchain node, a blockchain API (e.g., blockchain API 108, blockchain API hosts 104, etc. with brief reference to FIG. 1), one or more consensus participants (e.g., consensus participant 103, with brief reference to FIG. 1), loyalty smart contract 1405, and/or the like. Loyalty partner system 1420 may comprise any suitable combination of hardware, software, and/or database components. For example, loyalty partner system 1420 may comprise one or more network environments, servers, computer-based systems, processors, databases, and/or the like. Loyalty partner system 1420 may comprise at least one computing device in the form of a computer or processor, or a set of computers and/or processors, although other types of computing units or systems may be used, such as, for example, a server, web server, pooled servers, or the like. Loyalty partner system 1420 may also include one or more data centers, cloud storages, or the like, and may include software, such as APIs, configured to perform various operations discussed herein. In various embodiments, loyalty partner system 1420 may be computer based, and may comprise a processor, a tangible non-transitory computer-readable memory, and/or a network interface, along with other suitable system software and hardware components. Instructions stored on the tangible non-transitory memory may allow loyalty partner system 1420 to perform various functions, as described herein.

In various embodiments, partner UI 1415 may be configured to provide a web-based interface for customer 109 to interact with loyalty partner system 1420, complete one or more reward events, and the like, as discussed further herein. For example, partner UI 1415 may comprise software, a mobile application, a web interface, or the like accessible by customer 109. For example, partner UI 1415 may include a graphical user interface ("GUI"), software modules, logic engines, various databases, interfaces to systems and tools, and/or computer networks. In various embodiments, partner UI 1415 may be similar to loyalty partner site 106A, with brief reference to FIG. 1.

In various embodiments, partner UI 1415 may comprise an embedded software development kit (SDK), API, web service, or the like configured to invoke loyalty iFrame 1425. The embedded SDK may comprise executable code configured to reference an HTML page, JAVASCRIPT® library, or the like residing on loyalty partner system 1420. For example, in response to partner UI 1415 executing the embedded SDK, the embedded SDK may perform operations to cause loyalty iFrame 1425 to load and be displayed for customer 109. In response to being invoked, loyalty iFrame 1425 may be configured to perform various operations discussed further herein, including, for example, fetching a customer login page from loyalty provider system 1430 and transmitting data between loyalty provider system 1430 and loyalty partner system 1420.

In various embodiments, loyalty provider system 1430 may be in electronic communication with loyalty iFrame 1425 and/or blockchain 102. In various embodiments, the electronic communication between loyalty provider system 1430 and blockchain 102 may include one or more components configured to enable loyalty provider system 1430 to communicate with blockchain 102, such as, for example, a blockchain node, a blockchain API (e.g., blockchain API 108, blockchain API hosts 104, etc., with brief reference to FIG. 1), one or more consensus participants (e.g., consensus participant 103, with brief reference to FIG. 1), loyalty smart contract 1405, and/or the like. Loyalty provider system 1430 may comprise any suitable combination of hardware, software, and/or database components. For example, loyalty provider system 1430 may comprise one or more network environments, servers, computer-based systems, processors, databases, and/or the like. Loyalty provider system 1430 may comprise at least one computing device in the form of a computer or processor, or a set of computers and/or processors, although other types of computing units or systems may be used, such as, for example, a server, web server, pooled servers, or the like. Loyalty provider system 1430 may also include one or more data centers, cloud storages, or the like, and may include software, such as APIs, configured to perform various operations discussed herein. In various embodiments, loyalty provider system 1430 may be computer based, and may comprise a processor, a tangible non-transitory computer-readable memory, and/or a network interface, along with other suitable system software and hardware components. Instructions stored on the tangible non-transitory memory may allow loyalty provider system 1430 to perform various functions, as described herein.

In various embodiments, loyalty provider system 1430 may comprise any suitable provider of loyalty points such as, for example, a financial institution, transaction account issuer, travel provider (e.g., airline, hotel, etc.) and/or the like. For example, loyalty provider system 1430 may comprise or interact with a traditional payment network or transaction network to facilitate purchases and payments, authorize transactions, settle transactions, and/or the like. For example, loyalty provider system 1430 may represent existing proprietary networks that presently accommodate transactions for credit cards, debit cards, and/or other types of transaction accounts or transaction instruments. Loyalty provider system 1430 may provide a closed network that is secure from eavesdroppers. In various embodiments, loyalty provider system 1430 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network, transaction network, or the like. Loyalty provider system 1430 may include systems and databases related to financial and/or transactional systems and processes, such as, for example, one or more authorization engines, authentication engines and databases, settlement engines and databases, accounts receivable systems and databases, accounts payable systems and databases, and/or the like. In various embodiments, loyalty provider system 1430 may also comprise a transaction account issuer's Credit Authorization System ("CAS") capable of authorizing transactions, as discussed further herein.

In various embodiments, loyalty provider system 1430 may comprise, or be in electronic communication with, a loyalty provider database 1435. Loyalty provider database 1435 may comprise any suitable type of database, and may store and maintain data according to any suitable or desired format. Loyalty provider database 1435 may be configured to store and maintain decentralized loyalty IDs for one or more customers 109. Loyalty provider database 1435 may store the loyalty ID in association with customer data, such as, for example, a customer login credential (e.g., username, password, biometric input, etc.), transaction account data, and/or the like.

Figure 15:
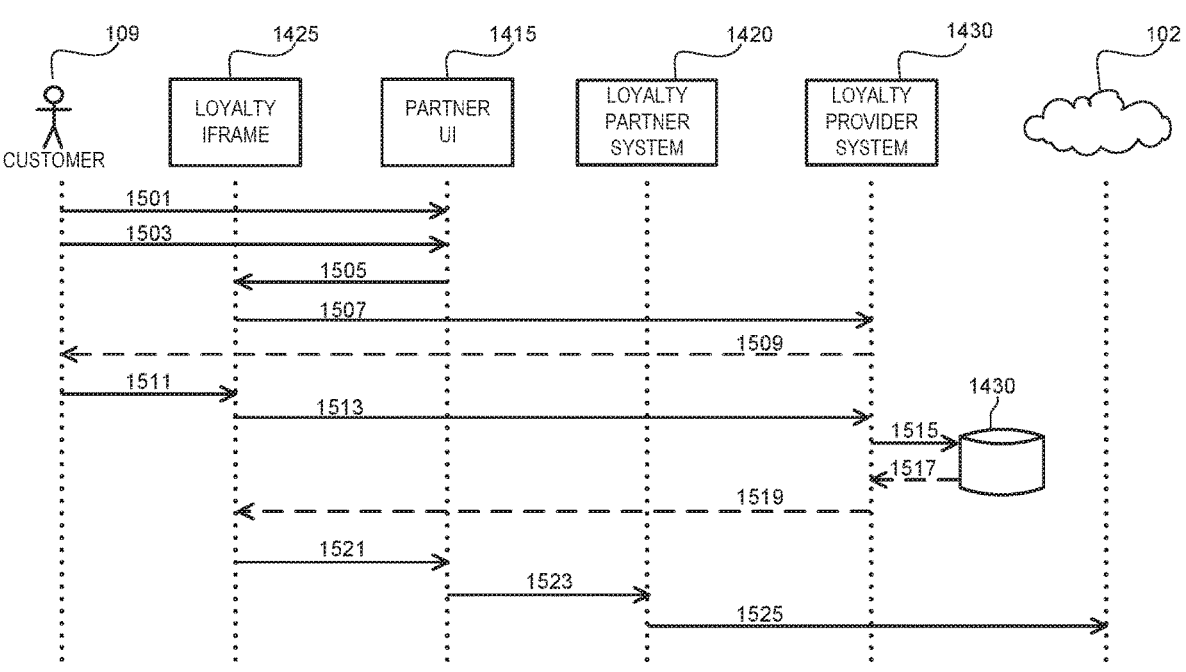
FIG. 15 illustrates a process for distributing loyalty points in the system for loyalty point distributions using a decentralized loyalty ID, in accordance with various embodiments.
Figure 16:
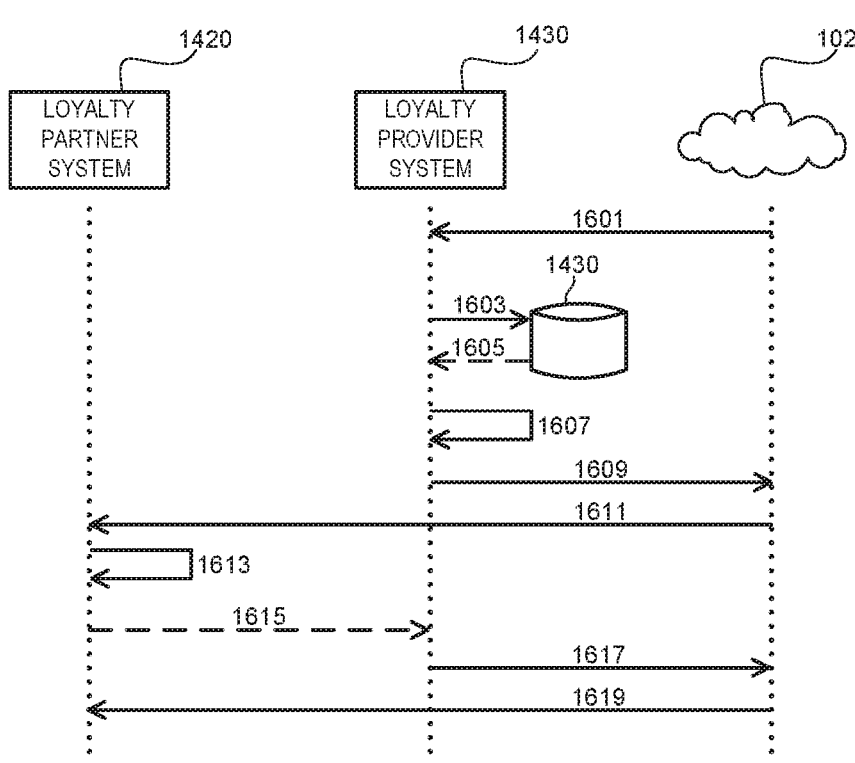
FIG. 16 illustrates a process for partner remittance of distributed loyalty points in the system for loyalty point distributions using a decentralized loyalty ID, in accordance with various embodiments.
Figure 17:
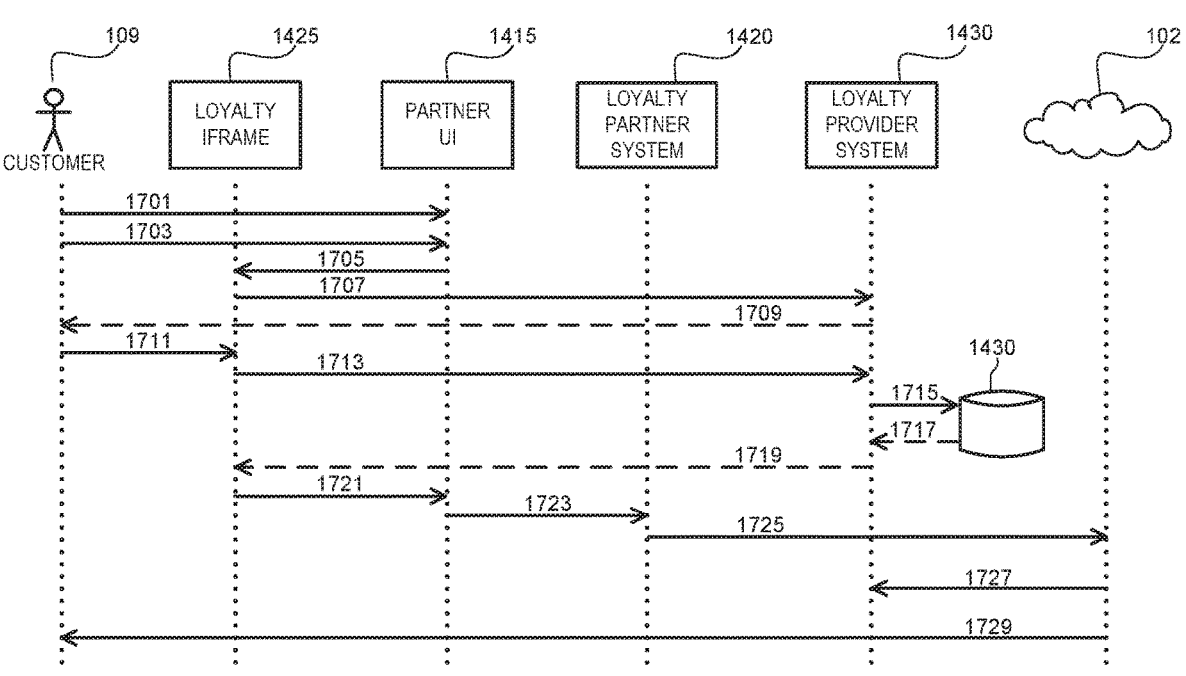
FIG. 17 illustrates a process for a user to spend their loyalty points in the system for loyalty point distributions using a decentralized loyalty ID, in accordance with various embodiments.

Referring now to FIGS. 15-17, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 15-17, but also to the various system components as described above with reference to FIGS. 1, 10 and 14. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the figures and described below.

With specific reference to FIG. 15, a process 1500 for distributing loyalty points in the system for loyalty point distributions using a decentralized loyalty ID is disclosed. In various embodiments, customer 109 may register with the system before becoming eligible to receive loyalty point distributions (e.g., process 200, with brief reference to FIG. 2). For example, customer 109 may register with one or more loyalty provider systems 1430 to become eligible to receive loyalty point distributions. By registering with loyalty provider system 1430, customer 109 may be assigned a loyalty ID (e.g., a decentralized loyalty ID), as discussed further herein.

In various embodiments, customer 109 interacts with partner UI 1415 (Step 1501). For example, wherein partner UI 1415 comprises a loyalty partner website (e.g., loyalty partner site 106), customer 109 may interact with partner UI 1415 to view various goods, services, or the like available by the loyalty partner. As a further example, wherein partner UI

1415 is associated with non-transaction-based loyalty point distributions, the customer 109 may interact with partner UI via a behavioral interaction (e.g., completing a survey, using a fitness tracker, etc.). Customer 109 initiates a rewards event with partner UI 1415 (Step 1503). The rewards event may be defined by each loyalty partner system 1420. For example, wherein partner UI 1415 comprises a loyalty partner website (e.g., loyalty partner site 106), the rewards event may comprise customer 109 initiating a transaction to purchase goods or services. In various embodiments, the transaction may be part of a multi-merchant loyalty point partnership (e.g., as discussed in process 1300, with brief reference to FIG. 13). As a further example, wherein the customer 109 interaction is a behavioral interaction, the rewards event may comprise a specific interaction (e.g., completion of a survey), a milestone (e.g., based on fitness tracker data), or any other suitable or desired behavioral activity. For example, each specific behavioral interaction may correspond with a fixed rewards event. For example, in response to a behavioral interaction being enrolling in a mailing list, the fixed rewards event may comprise a loyalty points payout amount (e.g., 10,000 points). As a further example, in response to the behavioral interacting being submitted counted steps from a pedometer, the fixed rewards event may comprise a loyalty points payout amount based on the counted steps (e.g., 10 points rewarded for each 1,000 steps).

In response to customer 109 initiating the rewards event, partner UI 1415 invokes loyalty iFrame 1425 (Step 1505). Partner UI 1415 may invoke loyalty iFrame 1425 by executing an embedded SDK to cause loyalty iFrame 1425 to load for customer 109. In various embodiments, loyalty iFrame 1425 may be specific to one or more loyalty provider system 1430. In various embodiments, loyalty iFrame 1425 may comprise an API, drop down menu, or the like enabling customer 109 to select a loyalty provider, and/or to allow loyalty iFrame 1425 to match the most suitable loyalty provider. In various embodiments, one or more different loyalty providers may also comprise buttons, images, or the like displayed on loyalty iFrame 1425 to enable customer 109 to select the desired loyalty provider.

In response to being invoked, loyalty iFrame 1425 fetches a loyalty login page (Step 1507) from loyalty provider system 1430. Loyalty provider system 1430 returns the loyalty login page (Step 1509) to customer 109 (e.g., displayed via loyalty iFrame 1425). The loyalty login page may prompt customer 109 to input customer login credentials (e.g., username, password, biometric input, etc.) into the loyalty login page, via loyalty iFrame 1425.

Customer 109 inputs customer login credentials into the loyalty login page (Step 1511), via loyalty iFrame 1425. In response to receiving the customer login credentials, loyalty iFrame 1425 transmits the customer login credentials to loyalty provider system 1430 (Step 1513). In response to receiving the customer login credentials, loyalty provider system 1430 may parse the customer login credentials to determine the username, password, biometric input, etc. Loyalty provider system 1430 may be configured to validate the customer login credentials, such as, for example, by comparing the customer login credentials to stored customer login credentials, and/or through any other suitable or desired validation process. In various embodiments, in response to validating the customer login credentials, loyalty provider system 1430 may issue login cookies, a single sign-on token, and/or the like. In that regard, customer 109 may interact with various loyalty partner systems 1420 using the single sign-on token without needing to complete the login process again.

Loyalty provider system 1430 queries loyalty provider database 1435 (Step 1515) based on the received customer login credentials. For example, loyalty provider system 1430 may query loyalty provider database 1435 based on the username. In response to being unable to locate a match of the customer login credentials in loyalty provider database 1435, loyalty provider system 1430 may be configured to return a non-registration notification to loyalty iFrame 1425 to notify customer 109 that a loyalty ID has not been registered for customer 109. In various embodiments, the non-registration notification may also comprise instructions, a URL, or the like to enable customer 109 to register for a loyalty ID.

In response to locating a match of the customer login credentials, loyalty provider system 1430 retrieves a loyalty ID (Step 1517) associated with the received customer login credentials. Loyalty provider system 1430 transmits the loyalty ID to loyalty iFrame 1425 (Step 1519). Loyalty provider system 1430 may transmit the loyalty ID to loyalty iFrame 1425 via a JAVASCRIPT® callback function, or through any other suitable method. In response to receiving the loyalty ID, loyalty iFrame 1425 returns the loyalty ID to partner UI 1415 (Step 1521). In response to receiving the loyalty ID, partner UI 1415 returns the loyalty ID to loyalty partner system 1420 (Step 1523).

In response to receiving the loyalty ID, loyalty partner system 1420 records a customer reward to blockchain 102 (Step 1525). The customer reward may comprise a loyalty point distribution, a cashback reward, a rebate, and/or any other suitable reward. The customer reward may also comprise the partner ID, the loyalty ID, and/or the like. The loyalty point distribution may be based on the transaction amount, a purchased product (e.g., based on SKU) or service, the behavioral interaction, and/or the like. In various embodiments, the loyalty point distribution may also be based on completion of a multi-merchant loyalty point partnership (e.g., process 1300, with brief reference to FIG. 13).

In accordance with various embodiments, loyalty partner system 1420 may record the customer reward to blockchain 102 by invoking a blockchain API host 104 (e.g., as depicted in FIGS. 1 and 11). In response to being invoked, blockchain API host 104 may execute loyalty smart contract 1405. Loyalty smart contract 1405 may validate the customer reward data and record the customer reward to blockchain 102. For example, the customer reward data may be written to a loyalty point ledger associated with customer 109 (e.g., based on the loyalty ID). For example, and in accordance with various embodiments, wherein the customer reward is a rebate, the reward data may comprise rebate data including, for example, a rebate amount, an expiration date, rebate terms, the loyalty ID of customer 109 associated with the rebate, and/or the like.

In response to completing the write, blockchain API host 104 may propagate the customer reward write to at least one consensus participant 103 by transmitting the customer reward write to consensus participant 103 and/or by writing the customer reward to blockchain 102. The one or more consensus participants may achieve consensus on the write and the customer reward to blockchain 102. Consensus participants 103 achieve consensus and add the customer reward to the blockchain 102. Consensus participants 103 may achieve consensus using proof of work, proof of stake, practical byzantine fault tolerance, delegated proof of stake, or any other suitable consensus algorithm. Consensus participants 103 may write the customer reward to blockchain 102 using any suitable technique. In response to achieving consensus and completing the write, consensus participants 103 may transmit a write confirmation to blockchain API host 104. The write confirmation may comprise data indicating that the customer reward was successfully written to blockchain 102. In various embodiments, the write confirmation may also comprise data pointing to the location of the write on blockchain 102, such as a uniform resource locator (URL), or the like. In various embodiments, consensus participants 103 may notify customer 109, loyalty partner system 1420, and/or loyalty provider system 1430 of the completed customer reward.

With specific reference to FIG. 16, a process 1600 for partner remittance of distributed loyalty points in the system for loyalty point distributions using a decentralized loyalty ID is disclosed. Loyalty provider system 1430 receives an event notification (Step 1601) from blockchain 102. The event notification may be received in response to loyalty partner system 1420 recording a customer reward to blockchain 102 (e.g., Step 1525, with brief reference to FIG. 15). In response to receiving the event notification (e.g., a rewards event notification), loyalty provider system 1430 may parse the event notification to determine the loyalty ID, the loyalty point amount, the partner ID, and/or similar data.

Loyalty provider system 1430 queries loyalty provider database 1435 (Step 1603) based on the event notification. For example, loyalty provider system 1430 may query loyalty provider database 1435 based on the loyalty ID parsed from the event notification. Loyalty provider system 1430 retrieves customer data from loyalty provider database 1435 (Step 1605) based on the loyalty ID. The customer data may be associated with an account customer 109 holds with loyalty provider system 1430. For example, wherein loyalty provider system 1430 is a transaction account issuer, the customer data may comprise a user identifier, transaction account number, or the like identifying the transaction account associated with customer 109.

In response to determining the customer data, loyalty provider system 1430 locally distributes loyalty points to customer 109 (Step 1607) based on the loyalty point amount. For example, loyalty provider system 1430 may store and maintain a customer loyalty point balance for use in the system. Loyalty provider system 1430 may update the customer loyalty point balance by adding the loyalty point amount.

In various embodiments, the loyalty point distribution may comprise a universal loyalty point available for use at one or more loyalty partner systems 1420. In various embodiments, the loyalty point distribution may also be specific to the loyalty provider system 1430 distributing the loyalty points. In various embodiments, the loyalty point distribution may also comprise a monetary distribution, a cashback reward, a rebate, a cryptocurrency payout, or the like. For more information about cryptocurrency distributions, see U.S. patent application Ser. No. 15/956,982, entitled "REWARD POINT REDEMPTION FOR CRYPTOCURRENCY," and filed on Apr. 19, 2018, which is hereby incorporated by reference in its entirety for all purposes.

In response to locally distributing the loyalty points, loyalty provider system 1430 updates blockchain 102 (Step 1609) to clear the loyalty point ledger of customer 109 and/or to update the associated loyalty partner balance. For example, loyalty provider system 1430 may invoke a blockchain API host 104 (e.g., as depicted in FIGS. 1 and 11) to initiate the updates. Loyalty provider system 1430 may invoke blockchain API host 104 by transmitting the update data (e.g., the loyalty ID, the loyalty point amount, and instructions to clear the loyalty point amount from the loyalty point ledger associated with the loyalty ID, and/or the partner ID, the loyalty point amount, and instructions to update the loyalty partner balance associated with the partner ID based on the loyalty point amount) to blockchain API host 104. In response to being invoked, blockchain API host 104 may execute loyalty smart contract 1405. Loyalty smart contract 1405 may validate the update data and update the loyalty point ledger and/or loyalty partner balance on blockchain 102.

In response to completing the write, blockchain API host 104 may propagate the update write to at least one consensus participant 103 by transmitting the update write to consensus participant 103 and/or by writing the updates to blockchain 102. The one or more consensus participants 103 may achieve consensus on the write and to blockchain 102. Consensus participants 103 achieve consensus and add the write to the blockchain 102. Consensus participants 103 may achieve consensus using proof of work, proof of stake, practical byzantine fault tolerance, delegated proof of stake, or any other suitable consensus algorithm. Consensus participants 103 may write the updates to blockchain 102 using any suitable technique. In response to achieving consensus and completing the write, consensus participants 103 may transmit a write confirmation to blockchain API host 104. The write confirmation may comprise data indicating that the updates were successfully written to blockchain 102. In various embodiments, the write confirmation may also comprise data pointing to the location of the update write on blockchain 102, such as a uniform resource locator (URL), or the like.

In various embodiments, consensus participants 103 may notify loyalty partner system 1420 and/or loyalty provider system 1430 of the completed update writes. For example, blockchain 102 (e.g., via a consensus participant 103) may transmit a balance update notification to loyalty partner system 1420 (Step 1611). The balance update notification may comprise data indicating the loyalty point amount added to the loyalty partner balance, the new loyalty partner balance, data pointing to the location of the update write on blockchain 102, and/or the like. The balance update notification may be transmitted via SMS, MMS, email, push notification, or the like.

In various embodiments, in response to receiving the balance update notification loyalty partner system 1420 initiates a payment to loyalty provider system 1430 (Step 1613) based on the loyalty partner balance. The loyalty partner balance may comprise a balance of loyalty point distributions completed by the loyalty partner system 1420 (e.g., process 1500, with brief reference to FIG. 1500). In that respect, the loyalty partner balance may represent a debit due by loyalty partner system 1420. Loyalty partner system 1420 may initiate the payment using any suitable method. For example, loyalty partner system 1420 may initiate the payment via bank settlement system 1020, with brief reference to FIG. 1020. Loyalty partner system 1420 may remit payment using any suitable currency and in any suitable form (e.g., mailing a check, initiating an electronic funds transfer, etc.). The payment may be in full (e.g., the entire loyalty partner balance) or a partial value less than the loyalty partner balance. In response to initiating the payment, loyalty partner system 1420 confirms the payment with loyalty provider system 1430 (Step 1615). In various embodiments, loyalty provider system 1430 may confirm receipt of the payment with loyalty partner system 1420.

In response to receiving confirmation of the payment, loyalty provider system 1430 updates the loyalty partner balance on blockchain 102 (Step 1617). For example, loyalty provider system 1430 may invoke a blockchain API host 104 (e.g., as depicted in FIGS. 1 and 11) to initiate the update. Loyalty provider system 1430 may invoke blockchain API host 104 by transmitting the update data (e.g., the partner ID, the payment amount, and instructions to update the loyalty partner balance associated with the partner ID based on the payment amount) to blockchain API host 104. In response to being invoked, blockchain API host 104 may execute loyalty smart contract 1405. Loyalty smart contract 1405 may validate the update data and update the loyalty partner balance on blockchain 102.

In response to completing the write, blockchain API host 104 may propagate the update write to at least one consensus participant 103 by transmitting the update write to consensus participant 103 and/or by writing the updates to blockchain 102. The one or more consensus participants 103 may achieve consensus on the write and to blockchain 102. Consensus participants 103 achieve consensus and add the write to the blockchain 102. Consensus participants 103 may achieve consensus using proof of work, proof of stake, practical byzantine fault tolerance, delegated proof of stake, or any other suitable consensus algorithm. Consensus participants 103 may write the updates to blockchain 102 using any suitable technique. In response to achieving consensus and completing the write, consensus participants 103 may transmit a write confirmation to blockchain API host 104. The write confirmation may comprise data indicating that the updates were successfully written to blockchain 102. In various embodiments, the write confirmation may also comprise data pointing to the location of the update write on blockchain 102, such as a uniform resource locator (URL), or the like.

In various embodiments, consensus participants 103 may notify loyalty partner system 1420 and/or loyalty provider system 1430 of the completed payment write. For example, blockchain 102 (e.g., via a consensus participant 103) may transmit a (second) balance update notification to loyalty partner system 1420 (Step 1619). The balance update notification may comprise data indicating the payment amount applied to the loyalty partner balance, the new loyalty partner balance, data pointing to the location of the payment write on blockchain 102, and/or the like. The balance update notification may be transmitted via SMS, MMS, email, push notification, or the like.

With specific reference to FIG. 17, a process 1700 for a user to spend their loyalty points in the system for loyalty point distributions using a decentralized loyalty ID is disclosed. Customer 109 interacts with partner UI 115 (Step 1701). Customer 109 may interact with partner UI 1415 to view various goods, services, or the like available by the loyalty partner. Customer 109 initiates a transaction with partner UI 115 (Step 1703) and selects to remit payment for the transaction at least partially using loyalty points. Customer 109 may initiate the transaction by selecting one or more goods and/or services to purchase, by initiating a checkout process, or the like.

In response to customer 109 initiating the transaction, partner UI 1415 invokes loyalty iFrame 1425 (Step 1705). Partner UI 1415 may invoke loyalty iFrame 1425 by executing an embedded SDK to cause loyalty iFrame 1425 to load for customer 109 (e.g., via a web browser). In various embodiments, loyalty iFrame 1425 may be specific to one or more loyalty provider systems 1430. In response to being invoked, loyalty iFrame 1425 fetches a loyalty login page (Step 1707) from loyalty provider system 1430. Loyalty provider system 1430 returns the loyalty login page (Step 1709) to customer 109 (e.g., displayed via loyalty iFrame 1425). The loyalty login page may prompt customer 109 to input customer login credentials (e.g., username, password, biometric input, etc.) into the loyalty login page, via loyalty iFrame 1425.

In various embodiments, customer 109 inputs customer login credentials into the loyalty login page (Step 1711), via loyalty iFrame 1425. In response to receiving the customer login credentials, loyalty iFrame 1425 transmits the customer login credentials to loyalty provider system 1430 (Step 1713). In response to receiving the customer login credentials, loyalty provider system 1430 may parse the customer login credentials to determine the username, password, biometric input, etc. Loyalty provider system 1430 may be configured to validate the customer login credentials, such as, for example, by comparing the customer login credentials to stored customer login credentials, and/or through any other suitable or desired validation process. In various embodiments, in response to validating the customer login credentials, loyalty provider system 1430 may issue login cookies, a single sign-on token, and/or the like.

In various embodiments, loyalty provider system 1430 queries loyalty provider database 1435 (Step 1715) based on the received customer login credentials. For example, loyalty provider system 1430 may query loyalty provider database 1435 based on the username. In response to being unable to locate a match of the customer login credentials in loyalty provider database 1435, loyalty provider system 1430 may be configured to return a non-registration notification to loyalty iFrame 1425 to notify customer 109 that a loyalty ID has not been registered for customer 109. In various embodiments, the non-registration notification may also comprise instructions, a URL, or the like to enable customer 109 to register for a loyalty ID.

In response to locating a match of the customer login credentials, loyalty provider system 1430 retrieves a loyalty ID (Step 1717) based on the received customer login credentials. Loyalty provider system 1430 transmits the loyalty ID to loyalty iFrame 1425 (Step 1719). Loyalty provider system 1430 may transmit the loyalty ID to loyalty iFrame 1425 via a JAVASCRIPT® callback function, or through any other suitable method. In response to receiving the loyalty ID, loyalty iFrame 1425 returns the loyalty ID to partner UI 1415 (Step 1721). In response to receiving the loyalty ID, partner UI 1415 returns the loyalty ID and transaction data to loyalty partner system 1420 (Step 1723).

In various embodiments, in response to receiving the loyalty ID and the transaction data, loyalty partner system 1420 updates the loyalty point ledger of customer 109 (Step 1725). For example, loyalty partner system 1420 may invoke a blockchain API host 104 (e.g., as depicted in FIGS. 1 and 11) to initiate the update. Loyalty partner system 1420 may invoke blockchain API host 104 by transmitting the loyalty ID, the transaction amount or the selected loyalty points payment amount (e.g., if less than the full transaction amount), and/or instructions to update the loyalty point ledger of customer 109 to blockchain API host 104. In response to being invoked, blockchain API host 104 may execute loyalty smart contract 1405. Loyalty smart contract 1405 may validate the update data and update the loyalty point ledger on blockchain 102.

In response to completing the write, blockchain API host 104 may propagate the update write to at least one consensus participant 103 by transmitting the update write to consensus participant 103 and/or by writing the updates to blockchain 102. The one or more consensus participants 103 may achieve consensus on the write and to blockchain 102. Consensus participants 103 achieve consensus and add the write to the blockchain 102. Consensus participants 103 may achieve consensus using proof of work, proof of stake, practical byzantine fault tolerance, delegated proof of stake, or any other suitable consensus algorithm. Consensus participants 103 may write the updates to blockchain 102 using any suitable technique. In response to achieving consensus and completing the write, consensus participants 103 may transmit a write confirmation to blockchain API host 104. The write confirmation may comprise data indicating that the updates were successfully written to blockchain 102. In various embodiments, the write confirmation may also comprise data pointing to the location of the update write on blockchain 102, such as a uniform resource locator (URL), or the like.

In various embodiments, consensus participants 103 may notify loyalty partner system 1420 and/or loyalty provider system 1430 of the completed update write. For example, blockchain 102 (e.g., via a consensus participant 103) may transmit a customer loyalty point event to loyalty provider system 1430 (Step 1727), and/or loyalty partner system 1420. The customer loyalty point event may comprise data indicating the amount deducted from the loyalty point ledger of customer 109, the new loyalty point ledger balance, data pointing to the location of the update write on blockchain 102, and/or the like. The balance update notification may be transmitted via SMS, MMS, email, push notification, or the like.

In various embodiments, consensus participants 103 may also notify customer 109 of the loyalty point deduction. For example, blockchain 102 (e.g., via a consensus participant 103) may transmit a loyalty point ledger update notification to customer 109 (Step 1729). The loyalty point ledger update notification may comprise data indicating to customer 109 that the customer's loyalty point ledger was updated, including, for example, the new loyalty point ledger balance, the loyalty point amount deducted from the loyalty point ledger, and/or the like. The loyalty point ledger update notification may be transmitted via SMS, MMS, email, push notification, or the like.

In various embodiments, in response to receiving the customer loyalty point from blockchain 102, or simultaneous with updating the loyalty point ledger of customer 109 (e.g., Step 1725), loyalty partner system 1420 may process the transaction initiated by customer 109. Loyalty partner system 1420 may process the transaction using typical payment processing techniques and architecture. For example, loyalty partner system 1420 may transmit transaction data to a transaction account issuer system or payment network (e.g., loyalty provider system 1430), and the issuer system or payment network may authenticate, authorize, and/or process the transaction. In response to the issuer system or payment network completing processing of the transaction, loyalty partner system 1420 may complete the transaction with customer 109.

The systems and processes described herein improve the functioning of the computer by propagating loyalty point data quickly and immutably, enabling multi-merchant loyalty point partnerships, and enabling loyalty point distributions using a decentralized loyalty ID. For example, by the user simply requesting a transaction using stored blockchain keys and account numbers as opposed to manually inputting data, the user performs less computer functions and provides less input, which saves on data storage and memory which speeds processing. Additionally, by transmitting, storing, and accessing data using the processes described herein, the security of the data is improved, which decreases the risk of the computer or network from being compromised. Use of blockchain 102 ensures integrity and immutability of communications in such way that neither of the interacting parties have to rely on a specific entity to maintain the state of the ledger. The use of blockchain 102 may also enable full transparency. Since all participants in effect maintain a single ledger, consistency may be maintained between various blockchain nodes. The complexity of the system is also reduced by alleviating the use of offline and/or batch processes typically used to keep multiple systems in sync. Further, by syncing data with the involved parties in real time (or near real time), the system may improve data integrity, data confidentiality, and data security, which may also improve the speed of the business process. The system may also reduce database synchronization errors by providing a common data structure, thus at least partially improving the integrity of stored data.

Data transfers performed through the system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times and the speed of transferring data, initiating purchases, and completing purchases in the system may be improved compared to existing systems, and implementation costs and time to market may also be drastically reduced.

In various embodiments, the system also offers increased reliability and fault tolerance over traditional databases (e.g., relational databases, distributed databases, etc.) as each node may operate with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCK-CHAIN and filed Aug. 21, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCK-CHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZA-TION PROCESS USING BLOCKCHAIN and filed on Nov. 28, 2017, and U.S. application Ser. No. 16/012,598 titled BUYER-CENTRIC MARKETPLACE USING BLOCK- CHAIN and filed on Jun. 19, 2018, the contents of which are each incorporated by reference in its entirety.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

Phrases and terms similar to "account," "account number," "account code," or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The phrases "consumer," "customer," "user," "account holder," "account affiliate," "cardmember," or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random-access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "eBook," an "eMagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location-based service. Distribution channels may include at least one of a merchant website, a social media site, affiliate or partner websites, an external vendor, and a mobile device communication. Examples of social media sites include FACEBOOK®, FOUR-SQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVING-SOCIAL®, and the like. Moreover, examples of mobile device communications include texting, email, and mobile applications for smartphones.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

In various embodiments, components, modules, and/or engines of loyalty point network 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any database discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the stand-alone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces such as for example REACHJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A method, comprising:

determining, by a processor, that a reward event has been initiated by a user based at least in part on a completion of a behavioral event or a transactional event;

invoking, by the processor, executable code to display a user interface for selecting a loyalty provider for storing the reward event in response to determining the reward event has been initiated;

identifying, by the processor, a selected loyalty provider for storing the reward event based at least in part on a selection of a user interface element for the loyalty provider;

invoking, by the processor, the executable code to display a login page for the selected loyalty provider within the user interface based at least in part on fetching the login page for the selected loyalty provider from a provider system and by loading the login page within the user interface;

determining, by the processor, a decentralized ID based at least in part on a customer login credential received via the login page, the decentralized ID being determined by submitting a query to a loyalty provider database using the customer login credential, the decentralized ID comprising a public key associated with the user; and causing, by the processor, a customer reward to be written to a blockchain based at least in part on the public key, wherein the customer reward is written to a private or a semi-private ledger associated with the user by a loyalty ID and maintained by the blockchain, and wherein a smart contract is executed to validate the customer reward by comparing the decentralized ID to the loyalty ID associated with the private or the semi-private ledger.

2. The method of claim 1, wherein invoking the executable code to display the login page for the selected loyalty provider further comprising:

causing, by the processor, the executable code to fetch the login page from a loyalty provider system associated with the selected loyalty provider.

3. The method of claim 1, wherein the executable code configured to reference an HTML page or a software library associated with a loyalty provider system for displaying the login page for the selected loyalty provider.

4. The method of claim 1, wherein the customer reward comprises the reward event, a partner ID associated with the loyalty provider, and the decentralized ID.

5. The method of claim 1, further comprising:

validating, by the processor, the customer login credential by transmitting the customer login credential to a loyalty provider system; and receiving, by the processor, a login cookie for the executable code from the loyalty provider system a transaction request, wherein the transaction request comprises a loyalty point payment request.

6. The method of claim 1, wherein causing the customer reward to be written to the blockchain further comprises executing a smart contract to write the customer reward to the private or the semi-private ledger of the blockchain.

7. The method of claim 1, wherein causing the customer reward to be written to the blockchain further comprises executing the smart contract to write the customer reward to the private or the semi-private ledger of the blockchain in response to validating the customer reward.

8. A system, comprising:

a computing device that includes a processor;

a memory configured to communicate with the processor; and machine-readable instructions stored in the memory that, when executed by the processor, cause the computing device to at least:

determine that a reward event has been initiated by a user based at least in part on a completion of a behavioral event or a transactional event;

invoke executable code to display a user interface for selecting a loyalty provider for storing the reward event in response to determining the reward event has been initiated;

identify a selected loyalty provider for storing the reward event based at least in part on a selection of a user interface element for the loyalty provider;

invoke the executable code to display a login page for the selected loyalty provider within the user interface based at least in part on fetching the login page for the selected loyalty provider from a provider system and by loading the login page within the user interface;

determine a decentralized ID based at least in part on a customer login credential received via the login page, the decentralized ID being determined by submitting a query to a loyalty provider database using the customer login credential, the decentralized ID comprising a public key associated with the user; and cause a customer reward to be written to a blockchain based at least in part on the public key, wherein the customer reward comprises the reward event, a partner ID associated with the loyalty provider, and the decentralized ID, wherein the customer reward is written to a private or a semi-private ledger associated with the user by a loyalty ID and maintained by the blockchain, and wherein a smart contract is executed to validate the customer reward by comparing the decentralized ID to the loyalty ID associated with the private or the semi-private ledger.

9. The system of claim 8, wherein invoking the executable code to display the login page for the selected loyalty provider further comprises:

causing the executable code to fetch the login page from a loyalty provider system associated with the loyalty provider.

10. The system of claim 8, wherein the executable code configured to reference a software library associated with a loyalty provider system for displaying the login page for the selected loyalty provider.

11. The system of claim 8, wherein the customer reward comprises the reward event, a partner ID associated with the loyalty provider, and the decentralized ID.

12. The system of claim 8, wherein the machine-readable instructions, when executed by the processor, cause the computing device to at least:

validate the customer login credential by transmitting the customer login credential to a loyalty provider system; and receive a login cookie for the executable code from the loyalty provider system a transaction request, wherein the transaction request comprises a loyalty point payment request.

13. The system of claim 8, wherein causing the customer reward to be written to the blockchain further comprises executing a smart contract to write the customer reward to the private or the semi-private ledger of the blockchain.

14. The system of claim 8, wherein causing the customer reward to be written to the blockchain further causes the computing device to at least cause the smart contract to write the customer reward to the private or the semi-private ledger of the blockchain in response to validating the customer reward.

15. A non-transitory computer readable medium having machine-readable instructions executable by a processor of a computing device, wherein the machine-readable instructions, when executed by the processor, cause the computing device to at least:

determine that a reward event has been initiated by a user based at least in part on a completion of a behavioral event or a transactional event;

invoke executable code to display a user interface for selecting a loyalty provider for storing the reward event in response to determining the reward event has been initiated;

identify a selected loyalty provider for storing the reward event based at least in part on a selection of a user interface element for the loyalty provider;

invoke the executable code to display a login page for the selected loyalty provider within the user interface based at least in part on fetching the login page for the selected loyalty provider from a provider system and by loading the login page within the user interface;

determine a decentralized ID based at least in part on a customer login credential received via the login page, the decentralized ID being determined by submitting a query to a loyalty provider database using the customer login credential, the decentralized ID comprising a public key associated with the user; and cause a customer reward to be written to a blockchain based at least in part on the public key, wherein the customer reward comprises the reward event, a partner ID associated with the loyalty provider, and the decentralized ID, wherein the customer reward is written to a private or a semi-private ledger associated with the user by a loyalty ID and maintained by the blockchain, and wherein a smart contract is executed to validate the customer reward by comparing the decentralized ID to the loyalty ID associated with the private or the semi-private ledger.

16. The non-transitory computer readable medium of claim 15, wherein invoking the executable code to display the login page for the selected loyalty provider further comprises:

causing the executable code to fetch the login page from a loyalty provider system associated with the selected loyalty provider.

17. The non-transitory computer readable medium of claim 15, wherein the executable code configured to reference a software library associated with a loyalty provider system for displaying the login page for the selected loyalty provider.

18. The non-transitory computer readable medium of claim 17, wherein the machine-readable instructions, when executed by the processor, further cause the computing device to at least cause the smart contract to write the customer reward to the private or the semi-private ledger of the blockchain in response to validating the customer reward.

19. The non-transitory computer readable medium of claim 15, wherein the customer reward comprises the reward event, a partner ID associated with the loyalty provider, and the decentralized ID.

20. The non-transitory computer readable medium of claim 15, wherein the machine-readable instructions, when executed by the processor, cause the computing device to at least:

validate the customer login credential by transmitting the customer login credential to a loyalty provider system; and receive a login cookie for the executable code from the loyalty provider system a transaction request, wherein the transaction request comprises a loyalty point payment request.

* * * * *